United States Patent
Shoshan et al.

(10) Patent No.: US 9,451,476 B2
(45) Date of Patent: Sep. 20, 2016

(54) VARIOUS ROUTING ARCHITECTURES FOR DYNAMIC MULTI-HOP BACKHAULING CELLULAR NETWORK AND VARIOUS METHODS USEFUL IN CONJUNCTION THEREWITH

(75) Inventors: Yaakov Shoshan, Ashkelon (IL); Gil Koifman, Petach-Tikva (IL); Adi Schwartz, Holon (IL)

(73) Assignee: ELTA SYSTEMS LTD., Ashdod (IL)

( * ) Notice: Subject to any disclaimer, the term of this patent is extended or adjusted under 35 U.S.C. 154(b) by 395 days.

(21) Appl. No.: 13/989,589

(22) PCT Filed: Nov. 23, 2011

(86) PCT No.: PCT/IL2011/050027
§ 371 (c)(1),
(2), (4) Date: Dec. 6, 2013

(87) PCT Pub. No.: WO2012/070049
PCT Pub. Date: May 31, 2012

(65) Prior Publication Data
US 2014/0080492 A1  Mar. 20, 2014

Related U.S. Application Data

(60) Provisional application No. 61/417,040, filed on Nov. 24, 2010.

(51) Int. Cl.
*H04W 16/32* (2009.01)
*H04W 40/22* (2009.01)
*H04B 7/155* (2006.01)

(52) U.S. Cl.
CPC ......... *H04W 16/32* (2013.01); *H04B 7/15507* (2013.01); *H04W 40/22* (2013.01)

(58) Field of Classification Search
CPC ... H04L 63/1458; H04L 45/12; H04L 45/00; H04L 45/745; H04L 49/25; H04W 12/12; H04W 88/14; H04W 16/32; H04W 40/22; H04B 7/15507
See application file for complete search history.

(56) References Cited

U.S. PATENT DOCUMENTS

| 4,236,158 A | 11/1980 | Daniel |
| 5,357,257 A | 10/1994 | Nevin |
| 5,363,111 A | 11/1994 | Murphy |
| 5,657,317 A | 8/1997 | Mahany et al. |

(Continued)

FOREIGN PATENT DOCUMENTS

| CN | 101523818 A | 9/2009 |
| EP | 0 615 391 A1 | 9/1994 |

(Continued)

OTHER PUBLICATIONS

Toussaint; "The Relative Neighbourhood Graph of a Finite Planar Set;" Pattern Recognition; 1980; vol. 12; No. 4; pp. 1-14.

(Continued)

*Primary Examiner* — Nizar Sivji
(74) *Attorney, Agent, or Firm* — Oliff PLC

(57) ABSTRACT

A hierarchical cellular network administration system operative to administrate for a hierarchical cellular network having a core, the hierarchical cellular network administration system comprising a link establishment initiator operative to generate link establishment commands; and relay manager functionality operative to establish at least one link between at least one relay in the hierarchical cellular network and all nodes in said cellular network desired to be served by said at least one relay, as per said link establishment commands generated by the link establishment initiator; and to control operation of links thus established.

26 Claims, 35 Drawing Sheets

(56) References Cited

U.S. PATENT DOCUMENTS

| | | | |
|---|---|---|---|
| 5,729,826 A | 3/1998 | Gavrilovich | |
| 5,990,831 A | 11/1999 | McDowell | |
| 6,115,409 A | 9/2000 | Upadhyay et al. | |
| 7,986,915 B1* | 7/2011 | Wang | H04B 7/155 455/7 |
| 8,019,029 B1 | 9/2011 | Katic | |
| 8,340,076 B2 | 12/2012 | Jetcheva et al. | |
| 8,676,144 B2 | 3/2014 | Guo et al. | |
| 2002/0006116 A1 | 1/2002 | Burkhart | |
| 2003/0226091 A1* | 12/2003 | Platenberg | H04L 1/22 714/776 |
| 2004/0146024 A1 | 7/2004 | Li et al. | |
| 2004/0185780 A1* | 9/2004 | Coupechoux | H04L 45/20 455/62 |
| 2004/0233882 A1* | 11/2004 | Park | H04L 45/00 370/338 |
| 2005/0073977 A1 | 4/2005 | Vanghi et al. | |
| 2005/0102529 A1 | 5/2005 | Buddhikot et al. | |
| 2005/0195767 A1 | 9/2005 | Rahman | |
| 2007/0183321 A1 | 8/2007 | Takeda et al. | |
| 2008/0045215 A1 | 2/2008 | Chen et al. | |
| 2008/0072014 A1 | 3/2008 | Krishnan et al. | |
| 2008/0090575 A1 | 4/2008 | Barak et al. | |
| 2008/0095282 A1 | 4/2008 | Walton et al. | |
| 2008/0114863 A1 | 5/2008 | Baskey et al. | |
| 2008/0188231 A1 | 8/2008 | Zhu et al. | |
| 2008/0192677 A1 | 8/2008 | Abusch-Magder et al. | |
| 2008/0291906 A1 | 11/2008 | Chigurupati et al. | |
| 2009/0003243 A1 | 1/2009 | Vaswani et al. | |
| 2009/0029645 A1 | 1/2009 | Leroudier | |
| 2009/0083803 A1 | 3/2009 | Alshaykh et al. | |
| 2009/0170475 A1 | 7/2009 | Ch'ng et al. | |
| 2009/0190521 A1 | 7/2009 | Horn et al. | |
| 2009/0247182 A1 | 10/2009 | Tamate | |
| 2009/0325615 A1 | 12/2009 | McKay et al. | |
| 2010/0046418 A1 | 2/2010 | Horn et al. | |
| 2010/0103845 A1 | 4/2010 | Ulupinar et al. | |
| 2010/0113090 A1 | 5/2010 | Lin et al. | |
| 2010/0142445 A1 | 6/2010 | Schlicht et al. | |
| 2010/0260129 A1 | 10/2010 | Ulupinar et al. | |
| 2010/0273504 A1 | 10/2010 | Bull et al. | |
| 2010/0303182 A1 | 12/2010 | Daneshrad et al. | |
| 2011/0081903 A1 | 4/2011 | Cai et al. | |
| 2011/0182253 A1 | 7/2011 | Shekalim | |
| 2011/0296051 A1* | 12/2011 | Vange | H04L 41/12 709/238 |
| 2011/0320524 A1 | 12/2011 | Nandagopal | |
| 2012/0140697 A1 | 6/2012 | Chen et al. | |
| 2012/0214445 A1 | 8/2012 | Stojanovski et al. | |
| 2012/0231797 A1 | 9/2012 | Van Phan et al. | |
| 2013/0039214 A1* | 2/2013 | Yedavalli | H04L 45/025 370/254 |
| 2014/0023079 A1* | 1/2014 | Li | H04L 45/00 370/392 |
| 2015/0237564 A1* | 8/2015 | Wang | H04B 7/155 370/315 |

FOREIGN PATENT DOCUMENTS

| | | |
|---|---|---|
| EP | 1 453 246 A1 | 9/2004 |
| EP | 1 826 963 A2 | 8/2007 |
| GB | 2422272 A | 7/2006 |
| IL | 206455 | 7/2011 |
| WO | 2007/054849 A2 | 5/2007 |
| WO | 2008/011717 A1 | 1/2008 |
| WO | 2008/046089 A2 | 4/2008 |
| WO | 2009/134178 A1 | 11/2009 |
| WO | 2010/006212 A2 | 1/2010 |
| WO | 2011/092698 A1 | 8/2011 |

OTHER PUBLICATIONS

Torlak; "Spatial Array Processing;" The University of Texas at Austin; http://users.ece.utexas.edu/~bevans/courses/ee381k/lectures/13_Array_Processing/lecture13/lecture13.pdf; pp. 1-25.

Hourani; "An Overview of Adaptive Antenna Systems;" Helsinki University of Technology; Postgraduate Course in Radio Communications (2004/2005); http://www.comlab.hut.fi/opetus/333/2004_2005_slides/Adaptive_antennas_text.pdf; pp. 1-5.

Loadman et al.; "An Overview of Adaptive Antenna Technologies for Wireless Communications;" Communication Networks and Services Research Conference; 2003; Session A3; pp. 15-19.

Santamaria et al.; "Optimal Mimo Transmission Schemes with Adaptive Antenna Combining in the RF Path;" 16th European Signal Processing Conference; Aug. 25-29, 2008; http://gtasweb.dicom.unican.es/files/Publicaciones/Congresos/Eusipco2008_MIMAX.pdf.

Das; "Smart Antenna Design for Wireless Communication using Adaptive Beam-forming Approach;" National Institute of Technology, Rourkela; http://dspace.nitrkl.ac.in:8080/dspace/bitstream/2080/832/1/das1.pdf.

Kootsookos et al.; "Imposing pattern nulls on broadband array responses;" J. Acoust. Soc. Am.; 1999; vol. 105; No. 6; pp. 3390-3398.

Li et al.; "An Examination of the Processing Complexity of an Adaptive Antenna System (AAS) for WiMax;" 2nd IEE/EURASIP DSPEnabledRadio Conference; 2005; pp. 1-5.

Widrow et al.; "Adaptive Antenna Systems;" Proceedings of the IEEE; 1967; vol. 55; No. 12; pp. 2143-2159.

Litva et al.; Digital Beamforming in Wireless Communications; 1996; Artech House, Inc.; Norwood, MA.

Sharp, "Information exchange over a wireless X2 interface between relay nodes," 3GPP TSG RAN WG2 Meeting #66, San Francisco, May 2009, pp. 1-3.

Teyeb et al., "Dynamic Relaying in 3GPP LTE-Advanced Networks," EURASIP Journal on Wireless Communications and Networking, Hindawi Publishing Corporation, vol. 2009, Jan. 2009, pp. 1-11.

Alnajjar et al., "SNR/RP Aware Routing Algorithm: Cross-Layer Design for Manets," International Journal of Wireless & Mobile Networks, vol. 1, No. 2, Nov. 2009, pp. 127-136.

Yamkomeroglu, H., "Fixed and Mobile Relaying Technologies for Cellular Networks," Workshop in Applications and Services in Wireless Networks, Jul. 2002, pp. 75-81.

Wikipedia "Encapsulation (networking)," accessed 2015, available from http://en.wikipedia.org/wiki/Encapsulation_(networking).

Wikipedia "Tunneling Protocol," accessed 2015, available from http://en.wikipedia.org/wiki/Tunneling_protocol.

Okuda et al. "Multihop relay extension for WiMAX networks—overview and benefits of IEEE 802.16j standard," FUJITSU Sci Tec J, 44, 3, Jul. 2008, p. 292, available on web at http://www.fujitsu.com/downloads/MAG/vol44-3/paper10.pdf.

Gross, F., "Smart Antennas for Wireless Communications," McGraw Hill, 2005.

Godara, C., "Smart Antennas," CRC Press, 2004.

Arson, et al., "WiMAX Technologies, Performance Analysis, and QoS," CRC Press, 2008.

Cheuk, et al., "Null-steering LMS Dual-Polarised Adaptive Antenna Arrays for GPS," Journal of Global Positioning Systems (2005), vol. 4, No. 1-2: 258-267.

3GPP TS 36.300—Evolved Universal Terrestrial Radio Access (E-UTRA) and Evolved Universal Terrestrial Radio Access Network (E-UTRAN); Overall description; Stage 2, also available from http://www.3gpp.org/ftp/Specs/html-info/36300.htm.

3GPP TS 36.302—Evolved Universal Terrestrial Radio Access (E-UTRA); Services provided by the physical layer, also available from http://www.3gpp.org/ftp/Specs/html-info/36302.htm.

Wikipedia "Wideband," accessed 2015, available from http://en.wikipedia.org/w/index.php?title=Wideband&oldid=522580153.

Budsabathon, M., et al.: "Optimum Beamforming for Pre-FFT OFDM Adaptive Antenna Array," IEEE Transactions on Vehicular Technology, vol. 53, No. 4, Jul. 1, 2004, pp. 945-955, XP11115402, IEEE Service Center, Piscataway, NJ, US.

Fazel, K., "Narrow-band interference rejection in orthogonal multi-carrier spread-spectrum communications," Universal Personal Communications, 1994, Sep. 27, 1994, pp. 46-50, XP010131551, New York, NY, USA, IEEE.

U.S. Appl. No. 13/575,795, filed Jul. 27, 2012 in the name of Giloh.

(56) References Cited

OTHER PUBLICATIONS

U.S. Appl. No. 14/604,079, filed Jan. 23, 2015 in the name of Giloh.

U.S. Appl. No. 14/604,075, filed Jan. 23, 2015 in the name of Giloh.
U.S. Appl. No. 13/989,666, filed Oct. 21, 2013 in the name of Giloh.

* cited by examiner

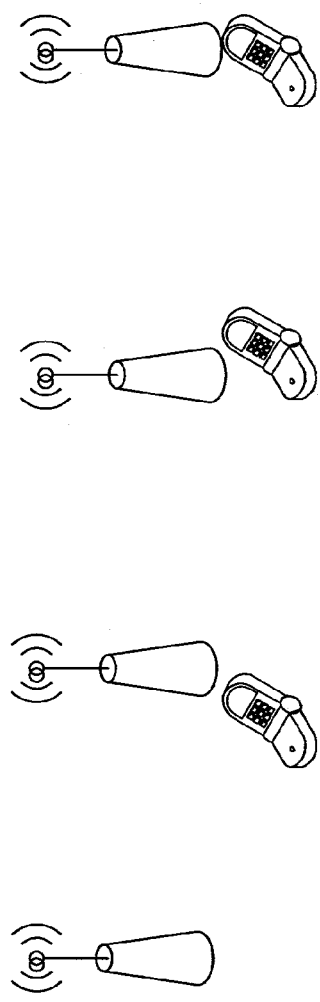
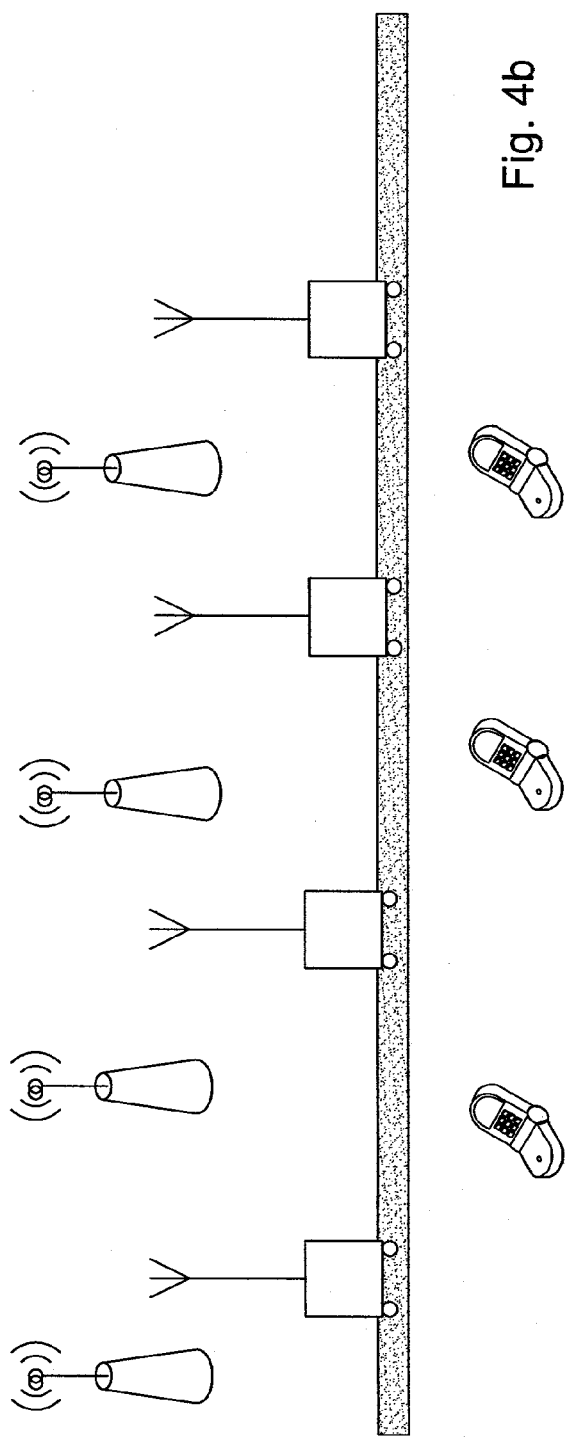

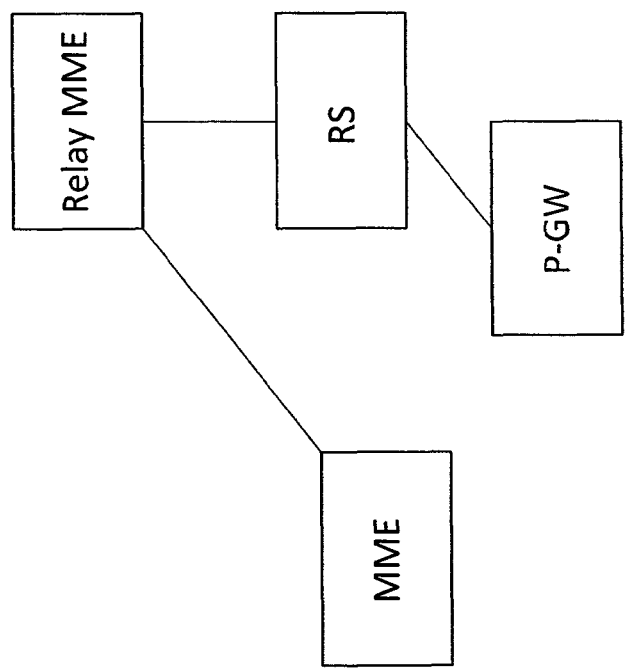

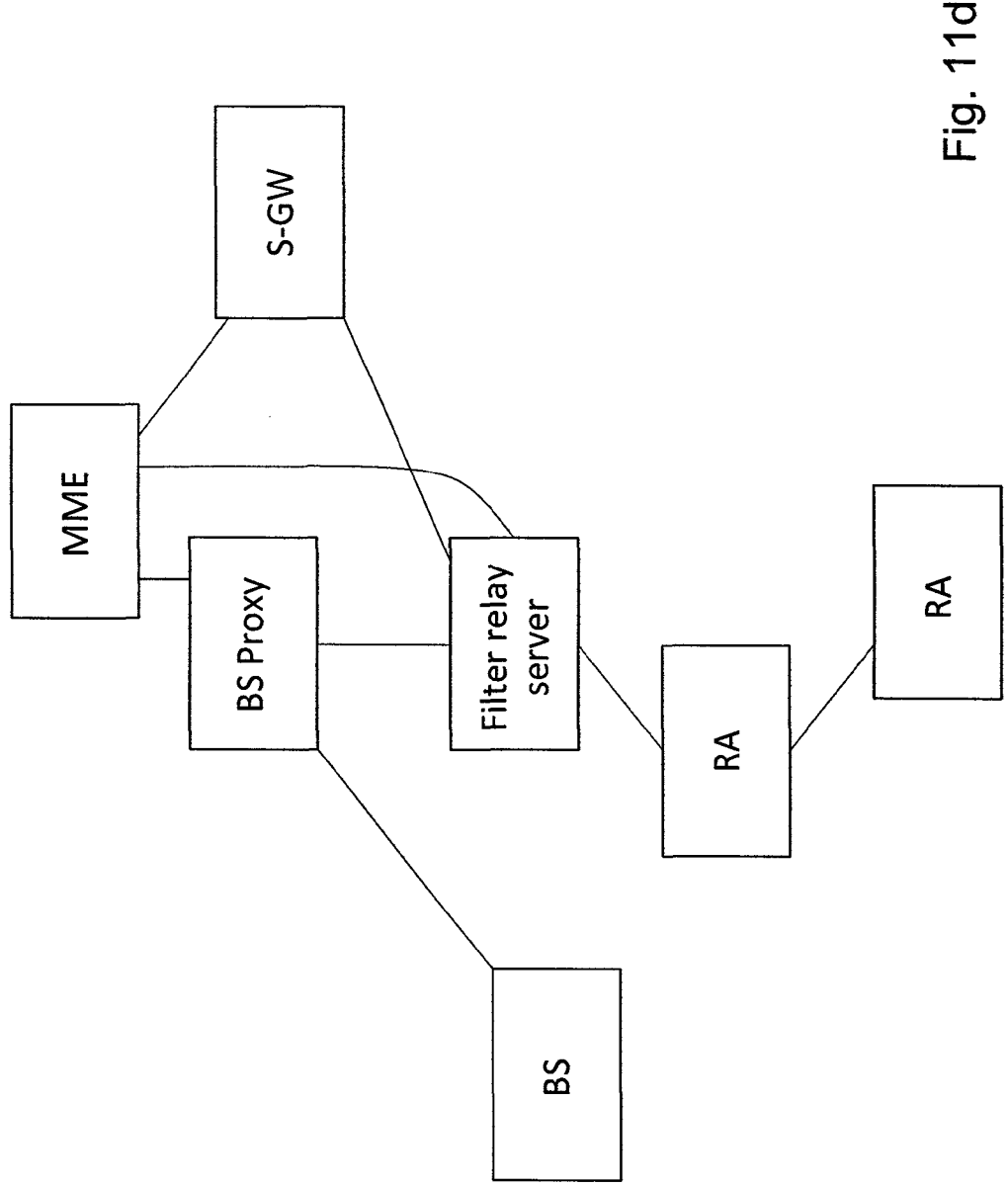

*Fig. 12a*

| RA | Moving relay agent having radio backhauling functionality as a core interface and base-station interface as an SM interface. Such as but not limited to the moving base stations e.g. MrS units described in Published PCT Patent Application WO/2011/092698, entitled "Cellular Communication System With Moving Base Stations And Methods And Apparatus Useful In Conjunction Therewith" |
|---|---|
| BS | Stationary, typically conventional base-station, able to communicate e.g. conventionally with the core and with mobile communication device users |
| SM | Mobile communication device e.g. Standard mobile phone |
| Node | BS or RA or other node, typically not including endpoint nodes (phones), in a cellular communication network |
| Link | A potential connection between two nodes |
| Active link | A link that is currently being used to pass e.g. packets between two nodes |
| Link state | Quality grade e.g. indicating the potential information-to-noise ratio of a link |
| User | User of the mobile phones, which typically dynamically move across the service zone of the network |
| QOS | A parameter set of an application or user expressing a priority of that application or user relative to other applications or users served by the same cellular communication network. The QOS may |

| | |
|---|---|
| | for example indicate different delay, error rate and/or guaranteed bit rate requirements |
| Core | Responsible for overall control of the SM and establishment of services |
| Resource allocation chain | A cellular network resource allocation, also termed herein "service establishment" or "service requirements establishment", typically allocated by each of a chain of cellular communication network nodes connecting two end-point nodes in the network, that guarantees at least one requirement (such as but not limited to QoS, bandwidth, minimum delay, maximal error rate) of a communication session between the two end-point nodes. An example Resource allocation chain is a bearer as defined in conventional protocols such as GSM, UMTS and LTE. |
| PS | Packet switched |
| CS | Context switched |
| RS | Relay server, residing typically inside the core and responsible for overall control of the SM and RA in the hierarchical system |
| RH | Relay helper residing inside the RA and responsible for the control of the SM and RA that are actively linked to its RA or to descendent/s thereof |

*Fig. 12b*

VARIOUS ROUTING ARCHITECTURES FOR DYNAMIC MULTI-HOP BACKHAULING CELLULAR NETWORK AND VARIOUS METHODS USEFUL IN CONJUNCTION THEREWITH

REFERENCE TO CO-PENDING APPLICATIONS

This application claims priority from U.S. provisional application No. 61/417,040, entitled "Various Routing Architectures for Dynamic Multi-Hop Backhauling Cellular Network and Various Methods Useful in Conjunction Therewith", filed Nov. 24, 2010.

FIELD OF THE INVENTION

The present invention relates generally to communication systems and more particularly to mobile communication systems.

BACKGROUND OF THE INVENTION

Many cellular communication networks are known, e.g. hierarchical mobile systems as described in U.S. Pat. No. 5,657,317 to Mahany et al and U.S. Pat. No. 5,729,826 to Gavrilovich.

LTE and Wimax are known standards for mobile communication networks.

The disclosures of all publications and patent documents mentioned in the specification, and of the publications and patent documents cited therein directly or indirectly, are hereby incorporated by reference.

SUMMARY OF THE INVENTION

Certain embodiments shown and described herein are particularly useful in conjunction with vehicle fleets in which vehicles, such as busses or trains or taxis, are equipped with mobile base-stations which may function as relays, and/or mobile telephones or other cellular communication devices.

For example, in rural areas where sole reliance on fixed cellular base-station coverage limits the capacity of mobile stations at long ranges, mobile base stations that are installed on transportable mobile platforms e.g. busses, trains, taxis can enable high data-rate applications such as web-browsing, video-streaming, and can also be used as relays between other mobile base stations and fixed base stations. In addition, mobile base stations as described herein can be installed on-board airplanes to enable passengers to communicate with a fixed cellular infrastructure using their own cellular phones. Finally, if a mass attended event is expected or has occurred, it may be desired to send a fleet of mobile base-stations to the location of that event for the duration of the event. For example, event organizers, e.g. cultural or sports event organizers, may own or hire such a fleet which may be sent on one occasion to a first city in which a massively attended popular music concert or rally is being held, and on another occasion to a location in which Olympics or another mass-attended sports event is planned.

Certain embodiments of the present invention seek to provide a dynamic self-learning centralistic network router for a multi-hop in-band backhauling network (centralistic approach), such as but not limited to broadcast (of the data/traffic) to neighbors, when the destination is not found, e.g. for voice calls or other applications; this has the advantage of low latency but may suffer from the disadvantage of placing a high load on the network; or paging in which control messages only are transmitted to neighbors, when the destination is not found, e.g. for data traffic applications such as but not limited to emails, file transfers, and browsing; this may suffer from the disadvantage of high latency but places only a low load on the network.

Certain embodiments of the present invention seek to provide a dynamic self-learning distributed network router for a multi-hop in-band backhauling network, typically including a distributed routing table at each hop.

Certain embodiments of the present invention seek to provide multi-hop routing using broadcast messaging e.g. for the DL.

Certain embodiments of the present invention seek to provide a relay comprising a plurality of BS transceivers, which typically facilitates enlargement of the overall network capacity by adding more DL resources to the relay.

Certain embodiments of the present invention seek to provide a relay comprising a plurality of MS transceivers, which typically facilitates enlargement of the overall network capacity by adding more UL resources to the relay. Optionally, all MS are connected to the same serving "parent" which may for example be a base station or a relay. Alternatively, each MS transceiver is connected to a serving "parent" independent of the other MS transceivers. According to still a further alternative, MS transceivers are grouped into at least two groups, each group being connected to a different serving "parent".

Certain embodiments of the present invention seek to provide a relay comprising a plurality of MS transceivers, and a plurality of BS transceivers.

Certain embodiments of the present invention seek to provide a Relay Manager which supervises relays and may be placed in a suitable location such as but not limited to the following LTE core architecture locations: as an Application Server, As an Pre-Serving-Gateway entity, As a Post-eNB entity. The Relay Manager may interface the MME as virtual eNBs or as a virtual MME (Relay MME).

Certain embodiments of the present invention seek to provide operating methods, e.g, routing methods, useful in conjunction with hierarchical networks such as but not limited to wireless hierarchical networks.

In a typical cellular telephone system, e.g. as depicted in prior art FIG. 1, an area is divided into cells where each cell has a serving BS. An SM moving in such a cellular network communicates by radio with the best BS. The BSs communicate with the core network and with each other by either using a direct cable, or by using point-to-point microwave.

Several procedures are common to all cellular telephone systems:

Handover is the procedure that runs when the SM moves between cells while it is in service.

Cell selection is the procedure that selects the best BS to link to.

A mobile ad-hoc network (MANET), e.g. as depicted in FIG. 2, is a well studied concept in prior art. MANET is defined as an autonomous system of mobile routes, their associated hosts being connected by wireless links, the union of which forms an arbitrary graph. Such networks have been introduced with little degree of success, due to many technical and organizational challenges among delays, power consumption and scalability.

A hierarchical mobile system, e.g. as depicted in FIG. 3, has two radio-interface serving entities; BS and RA. The BSs are static base stations and the RAs are moving base stations comprising a radio interface for a backhauling interface, and a base-station as a front end to the user. Due to dynamics in the hierarchical mobile system, it is difficult to use a directional antenna; therefore there is a need to use an omni antenna. The user can connect to a BS or to a RA using the same standard interface and is transparent to the kind that it is connected to.

In FIG. 3, SMs are numbered 03, 06, 07, 11 and 12. The RAs are numbered 02, 05 and 09. The BSs are numbered 01, 08 and 10. The core is numbered 4. SM12 links to BS10, BS08 and RA09, its best link is to BS10 and therefore it has an active link to the BS10 and connects to the core through BS10. SM11 links to RA09 BS08 and BS10, its best link is to BS08 and therefore it has an active link to BS08. SM03 links to SB10, SB08 and RA09 its best link is to RA09 and therefore it has active link to RA09. SM06 links to RA09, RA05, RA02 and BS01 its best link is to RA09 and therefore it has active link to RA09. SM07 links to RA09, RA05, RA02 and BS01 its best link is to RA05 and therefore it has active link to RA05.

RA02 links to RA09, BS01 its best link is to BS01 and therefore it has active link to BS01. RA09 links to RA02, BS01 and BS08 its best link is to BS08 and therefore it has active link to BS08. RA05 links to RA02, BS01 and BS08 its best link is to BS02 and therefore it has active link to BS02.

Certain embodiments of the present invention seek to provide Uplink/Downlink Multi-user in-band backhauling prioritization based on QOS criteria.

Certain embodiments of the present invention seek to provide load balancing in multi-hop relay architecture management based on network topology.

Certain embodiments of the present invention seek to provide multi-hop encapsulation for uplink in-band backhauling, such encapsulation comprising at least one bearer aggregating selected transmission. The aggregation and selection depends on bearer type, user type, service type, etc.

Certain embodiments of the present invention seek to provide multi-hop decapsulation for downlink in-band backhauling so as to decapsulate the above mentioned encapsulation techniques.

Certain embodiments of the present invention seek to provide a dynamic bandwidth request for enlarging/reducing the uplink bandwidth allocation, based on suitable criteria such as but not limited to some or all of the following: number of served users, number of active/idle users, type of served users (e.g. simple, chief, relay, others), type of service/application (e.g. voice, video, other), and QOS.

It is appreciated that depending on the application, data packets may store at least one of: voice, video and data information.

The present invention typically includes at least the following embodiments:

Embodiment 1

Relay apparatus including:
a relay manager operative to activate at least one link thereby to cause said relay apparatus to function as a node in a hierarchical cellular network; and
a first set of radio interfaces, having one or more radio interfaces, operative, when said relay apparatus is disposed at a level n of a hierarchical cellular network having a core, to provide:
a corresponding first set of uplinks, having one or more uplinks, from said relay apparatus to at least one node disposed at least one level in said network which is closer to the core than level n and
a corresponding set of downlinks, having one or more downlinks, from said at least one node to said relay.

Embodiment 2

Relay apparatus including:
a relay manager operative to activate at least one link thereby to cause the relay apparatus to function as a node in a hierarchical cellular network; and
a set of radio interfaces, having one or more radio interfaces, operative, when said relay apparatus is disposed at a level n of a hierarchical cellular network having a core, to provide:
a corresponding set of uplinks, having one or more uplinks, to said relay apparatus from at least one node disposed at least one level in said network which is further from the core than level n; and
a corresponding set of downlinks, having one or more downlinks, from said relay to said at least one node.

Embodiment 3

Relay apparatus according to embodiment 1 and also comprising a second set of radio interfaces operative, when said relay is disposed at a level n of a hierarchical cellular network having a core, to provide:
a corresponding second set of uplinks to said relay from at least one node disposed at least one level in said network which is further from the core than level n; and
a corresponding second set of downlinks from said relay to said at least one node.

Embodiment 4

A data relay manager providing method including:
providing a relay manager, operative to activate at least one link thereby to cause a relay to function as a node in a hierarchical cellular network, and a first set of radio interfaces operative, when said relay apparatus is disposed at a level n of a hierarchical cellular network having a core, to provide:
a corresponding first set of uplinks from said relay apparatus to at least one node disposed at least one level in said network which is closer to the core than level n and
a corresponding first set of downlinks from said at least one node to said relay.

Embodiment 5

A method according to embodiment 4 wherein said sets of uplinks and downlinks connect said relay to a single node disposed at a level in said network which is closer to the core than level n.

Embodiment 6

A method according to embodiment 4 wherein said sets of uplinks and downlinks connect said relay to a set of more than one nodes disposed at least one level in said network which is closer to the core than level n.

Embodiment 7

A method according to embodiment 6 wherein said set of uplinks and downlinks connect said relay to a set of nodes corresponding in number to said first set of radio interfaces and disposed at least one level in said network which is closer to the core than level n.

Embodiment 8

A hierarchical cellular network administration system operative to administrate for a hierarchical cellular network having a core, the hierarchical cellular network administration system comprising:

a link establishment initiator operative to generate link establishment commands; and relay manager functionality operative:

to establish at least one link between at least one relay in the hierarchical cellular network and all nodes in said cellular network desired to be served by said at least one relay, as per said link establishment commands generated by the link establishment initiator; and to control operation of links thus established.

Embodiment 9

A system according to embodiment 8 wherein said link establishment initiator is incorporated within a server located in the core of the network and wherein said server is also operative to interface the core's mobility manager including causing said mobility manager to provide said relay manager functionality.

Embodiment 10

A system according to embodiment 8 wherein said link establishment initiator and said relay manager functionality are incorporated within a server located in the core of the network.

Embodiment 11

A system according to embodiment 9 or embodiment 10 and also comprising a hierarchical/non-hierarchical information pre-processor, wherein said network includes at least one non-hierarchical base station which is operative to communicate with mobile communication devices and not with relays and at least one hierarchical base station which communicates with at least one relay and wherein said core includes a mobility manager and a serving gateway communicating with said mobility manager and, via said hierarchical/non-hierarchical information pre-processor, with at least one base, said hierarchical/non-hierarchical information pre-processor being operative to receive information from at least one non-hierarchical base station and from at least one hierarchical base station and to send information received from hierarchical base stations, but not information from non-hierarchical base stations, to the relay manager functionality.

Embodiment 12

A mobile communication management system serving a hierarchical cellular network having linked nodes, the nodes including a core, base stations and mobile communication devices, thereby to define a topology of communication links between said nodes, the system comprising:

a topology server including:

a topology learner which dynamically learns the topology and a topology storing functionality which stores the topology learned by the topology learner as at least one topology map structured as a hierarchy having more than 2 levels.

Embodiment 13

A system according to embodiment 12 wherein said topology server resides in a single node within said network.

Embodiment 14

A system according to embodiment 13 wherein said single node in which said topology server resides in the core.

Embodiment 15

A system according to embodiment 12 wherein said topology-storing functionality stores the topology as a hierarchy tree whose number of levels changes dynamically.

Embodiment 16

A system according to embodiment 12 wherein said server uses said topology map to dynamically route information through at least one downlinks to arrive at a desired destination.

Embodiment 17

A system according to embodiment 16 wherein said server uses said topology map to dynamically route information by indicating, for each of at least one levels, a sibling-node at said level via which node the information is to arrive at the desired destination within said map.

Embodiment 18

A system according to embodiment 17 wherein the server broadcasts data packets intended for a destination node not found at a topological location identified in said map by the server, to at least one base station in the topology map, each of which broadcast to at least one of their "children" nodes in the hierarchal network.

Embodiment 19

A system according to embodiment 18 wherein the server broadcasts the data packets intended for the not-found destination node to all base stations in a highest layer of the topology map, and each of said base stations broadcasts to all of their "children" nodes in the hierarchical network.

Embodiment 20

A system according to embodiment 19 wherein said not-found destination node sends an 'ack' to his father node in the hierarchy upon reception of said data packets and said 'ack' is transmitted over an uplink through the hierarchy to the topology server.

Embodiment 21

A system according to embodiment 19 wherein said data packets store at least one of: voice, video and data information.

Embodiment 22

A system according to embodiment 18 wherein the topology map defines a set of nodes and wherein the server broadcasts data packets intended for the not-found destination node only to a subset of said set of nodes which subset is characterized in that its nodes are adjacent topologically, in said map, to the topological location identified by the server as having belonged to the destination node.

Embodiment 23

A system according to embodiment 18 wherein the topology map defines a set of nodes and wherein the server broadcasts data packets intended for the not-found destination node only to a subset of said set of nodes whose subset is characterized in that its nodes are adjacent geographically to the geographical location of the destination node.

Embodiment 24

A system according to embodiment 17 wherein the server broadcasts a paging message intended to locate a destination node not found at a topological location, identified within said map by the server, to at least some base stations in the hierarchy, each of which broadcasts to at least one of their "children" nodes in the hierarchy.

Embodiment 25

A system according to embodiment 24 wherein the server broadcasts a paging message intended to locate the not-found destination node to all base stations in a highest layer of the topology map, and each of said base stations broadcasts the paging message to all of their "children" nodes in the hierarchical network.

Embodiment 26

A system according to embodiments 24 or 25 wherein said not-found destination node sends an 'ack', upon receipt of the paging message, to its father node in the hierarchy and said 'ack' is transmitted (uplink) through the hierarchy to the topology server.

Embodiment 27

A system according to embodiment 26 wherein only upon receipt of said 'ack', data packets intended for said destination node which sent said 'ack', are sent to said destination node.

Embodiment 28

A system according to embodiment 27 wherein said data packets sent only upon receipt of said 'ack', store at least one of: voice, video and data information.

Embodiment 29

A system according to embodiment 24 wherein the topology map defines a set of nodes and wherein the server broadcasts the paging message intended to locate the not-found destination node only to a subset of said set of nodes whose subset is characterized in that its nodes are adjacent topologically, in said map, to the topological location identified by the server as having belonged to the destination node.

Embodiment 30

A system according to embodiment 24 wherein the topology map defines a set of nodes and wherein the server broadcasts the paging message intended to locate the not-found destination node only to a subset of said set of nodes whose subset is characterized in that its nodes are adjacent geographically to the geographical location of the destination node.

Embodiment 31

A system according to embodiment 12 wherein said topology server is distributed over a set of nodes within said network such that least one topology map, representing at least a portion of the topology of the network, resides within each of said set of nodes.

Embodiment 32

A system according to embodiment 31 wherein at least one node stores a topology map including a list of at least some of its descendants and at least some routing information required to get to the descendants.

Embodiment 33

A system according to embodiment 32 wherein each relay positioned at a particular level in the hierarchy stores a topology map including:
 a list of all of its descendants; and
 routing information which identifies, for each individual descendant in said list, a topological location within the next level of the hierarchy to which to proceed, if it is desired to reach said individual descendant.

Embodiment 34

A system according to embodiment 31 wherein at least one individual node from among said set of nodes over which said topology server is distributed is operative to receive a report indicating that data packets have failed to reach a destination node not found at a topological location, within said map, identified by at least one of said individual node and a descendant thereof, and responsively, to broadcast said data packets to at least some of said individual node's "children".

Embodiment 35

A system according to embodiment 31 wherein at least one individual node from among said set of nodes over which said topology server is distributed is operative to receive a report indicating that data packets have failed to reach a destination node not found at a topological location, within said map, identified by at least one of said individual node or a descendant thereof, and responsively, to broadcast a paging message intended to locate said not-found destination node, to at least some of said individual node's "children".

Embodiment 36

A system according to embodiment 31 wherein at least one individual node from among said set of nodes is located in the core.

Embodiment 37

A system according to embodiment 31 wherein at least one individual node from among said set of nodes are not located in the core.

Embodiment 38

A system according to embodiment 12 and also comprising a multi-layer hierarchical cellular network including the nodes.

Embodiment 39

A system according to embodiment 31 wherein at least one individual node from among said set of nodes over which said topology server is distributed is operative to receive a report indicating that data packets have failed to reach a destination node not found at a topological location, within said map, identified by at least one of said individual node or a descendant thereof, and responsively, to broadcast a paging message intended to locate said not-found destination node, to at least some of said individual node's siblings.

Embodiment 40

A system according to embodiment 8 and also comprising core functionality providing a core for a cellular communication network and communicating with nodes of the network via a system of core-topmost node links.

Embodiment 41

A system according to embodiment 8 wherein communication between said link establishment initiator, said relay manager functionality and nodes in said network occurs via said system of core-topmost node links.

Embodiment 42

A system according to embodiment 17 wherein the server broadcasts data packets intended for a destination node not found at a topological location identified in said map by the server, to at least some base stations in the topology map, each of which broadcasts to at least some of its sibling nodes in the hierarchical network.

Embodiment 43

A system according to embodiment 31 wherein at least one individual node from among said set of nodes over which said topology server is distributed is operative to receive a report indicating that data packets have failed to reach a destination node not found at a topological location, within said map, identified by at least one of said individual nodes and a descendant thereof, and responsively, to broadcast said data packets to at least some of said individual node's siblings.

Embodiment 44

A system according to embodiment 8 wherein said link establishment initiator and said relay manager functionality each operate within at least one relay in the network.

Embodiment 45

A system according to embodiment 8 wherein said link establishment initiator is connected to the core and said relay manager functionality operates within at least one relay in the network.

Embodiment 46

A system according to any of the preceding embodiments 1-4, 8-10, 12-25, 27-43 wherein each mobile communicator in the network comprises one of: telephone, smart-phone, tablet, modem.

Embodiment 47

A system according to embodiment 46 wherein said mobile communicator comprises a cellular mobile communicator.

Embodiment 48

A system according to any of the preceding embodiments 1-4, 8-10, 12-25, 27-43 wherein said network operates using the LTE standard.

Embodiment 49

A system according to any of the preceding embodiments 1-4, 8-10, 12-25, 27-43 wherein said network operates using a WIMAX standard.

Embodiment 50

A system according to any of the preceding embodiments 1-4, 8-10, 12-25, 27-43 wherein said network operates using a 3G standard.

Embodiment 51

A system according to any of the preceding embodiments 1-4, 8-10, 12-25, 27-43 wherein said network operates using a WiFi standard.

Embodiment 52

A method for using a hierarchical communication network including hierarchical communication nodes, the method comprising:
  generating a topology map representing the network; and
  communicating over the network based on the topology map including dynamically changing the topology map based on handovers.

Embodiment 53

A system according to embodiment 18 wherein the server performs a recursive process in which, in a first iteration, the server broadcasts data packets intended for a destination node not found at a topological location identified in said map by the server, to at least one base station in the topology map, each of which, in a second iteration, broadcast to at least one of their "children" nodes in the hierarchical network, and wherein the "children" nodes continue the recursive process for at least a third iteration, down to a desired level of descendants of said "children" nodes.

Embodiment 54

A system according to embodiment 19 wherein the server performs a recursive process in which, in a first iteration, the server broadcasts the data packets intended for the not-found destination node to all base stations in a highest layer of the topology map, and each of said base stations, in a second iteration, broadcasts to all of their "children" nodes in the hierarchical network, and wherein the "children" nodes continue the recursive process for at least a third iteration, down to a desired level of descendants of said "children" nodes.

Embodiment 55

A system according to embodiment 25 wherein the server performs a recursive process in which, in a first iteration, the server broadcasts a paging message intended to locate the not-found destination node to all base stations in a highest layer of the topology map, and each of said base stations, in a second iteration, broadcasts the paging message to all of their "children" nodes in the hierarchical network, and wherein the "children" nodes continue the recursive process for at least a third iteration, down to a desired level of descendants of said "children" nodes.

Embodiment 56

A system according to embodiment 33 wherein said routing information does not identify all topological locations in all levels in the hierarchy through which to proceed in order to reach said individual descendant.

Embodiment 57

A system according to embodiment 11 wherein said hierarchical/non-hierarchical information pre-processor is also operative to cause said information from hierarchical base stations to be processed as if said network was a non-hierarchical network having no relays.

Embodiment 58

A system according to embodiment 12 wherein topology is determined centralistically.

Embodiment 59

A system according to embodiment 58 wherein topology is determined centralistically based on a potential number of hops.

Embodiment 60

A system according to embodiment 58 wherein topology is determined centralistically based on a backhauling link quality score characterizing at least one inter-node link.

Embodiment 61

A system according to embodiment 60 wherein said network comprises an LTE network and wherein said backhauling link quality score comprises at least one of a SNR (signal to noise ratio) measure, a bit/block/packet error rate measure, an RSRP measure, an RSSI measure and a RSRQ measure.

Embodiment 62

A system according to embodiment 60 wherein said network comprises a 3G network and wherein said backhauling link quality score comprises at least one of an RSCP measure, an Ec/No measure, an RSSI measure and an SIR (signal-to interference ratio) measure.

Embodiment 63

A system according to embodiment 12 wherein topology is determined at distributed locations over the topology.

Embodiment 64

A system according to embodiment 63 wherein topology is determined at distributed locations over the topology based on a potential number of hops.

Embodiment 65

A system according to embodiment 63 wherein topology is determined at distributed locations over the topology based on a backhauling link quality score characterizing at least one inter-node link.

Embodiment 66

A system according to embodiment 65 wherein said network comprises an LTE network and wherein said backhauling link quality score comprises at least one of a SNR (signal to noise ratio) measure, a bit/block/packet error rate measure, an RSRP measure, an RSSI measure and a RSRQ measure.

Embodiment 67

A system according to embodiment 65 wherein said network comprises a 3G network and wherein said backhauling link quality score comprises at least one of an RSCP measure, an Ec/No measure, an RSSI measure and an SIR (signal-to interference ratio) measure.

Embodiment 68

A method according to embodiment 52 wherein a central manager is operative for centralistically and dynamically changing the topology map based on handovers.

Embodiment 69

A method according to embodiment 52 wherein said dynamically changing the topology map based on handovers is performed by distributed management functionalities distributed over more than one node in the network.

Embodiment 70

A method according to embodiment 52 wherein said dynamically changing includes broadcasting backhauling link quality scores.

Embodiment 71

A system according to embodiment 12 and also comprising a local routing manager operative to perform a local process in which information is routed locally from one sibling node to another.

Embodiment 72

A system according to embodiment 12 and also comprising a local routing manager operative to perform a local process in which information is routed locally from one sibling tunnel to another.

Embodiment 73

A method according to embodiment 52 wherein the nodes intercommunicate using a communication standard which defines standard handovers and wherein the topology map can be dynamically changed using the standard handovers.

Embodiment 74

A data relaying method including:
using a relay manager to activate at least one link thereby to cause a relay to function as a node in a hierarchical cellular network; and
using a first set of radio interfaces, when said relay apparatus is disposed at a level n of a hierarchical cellular network having a core, to provide:
a corresponding first set of uplinks from said relay apparatus to at least one node disposed at least one level in said network which is closer to the core than level n and
a corresponding first set of downlinks from said at least one node to said relay.

Embodiment 75

A data relay providing method including:
providing a relay manager operative to activate at least one link thereby to cause the relay apparatus to function as a node in a hierarchical cellular network; and
providing a set of radio interfaces operative, when said relay apparatus is disposed at a level n of a hierarchical cellular network having a core, to provide:
a corresponding set of uplinks to said relay apparatus from at least one node disposed at least one level in said network which is further from the core than level n; and
a corresponding set of downlinks from said relay to said at least one node.

Embodiment 76

A hierarchical cellular network administration method operative to administrate for a hierarchical cellular network having a core, the hierarchical cellular network administration method comprising:
providing a link establishment initiator operative to generate link establishment commands; and
providing relay manager functionality operative:
to establish at least one link between at least one relay in the hierarchical cellular network and all nodes in said cellular network desired to be served by said at least one relay, as per said link establishment commands generated by the link establishment initiator; and
to control operation of links thus established.

Embodiment 77

A mobile communication management method serving a hierarchical cellular network having linked nodes, the nodes including a core, base stations and mobile communication devices, thereby to define a topology of communication links between said nodes, the method comprising:
providing a topology server including:
providing a topology learner which dynamically learns the topology and
storing the topology learned by the topology learner as at least one topology map structured as a hierarchy having more than 2 levels.

Embodiment 78

Apparatus according to any of embodiments 2, 8, 12 wherein the network comprises a wireless hierarchical network.

Embodiment 79

Apparatus according to any of embodiments 2, 8, 12 2, 8, 12 wherein said network comprises an E-UTRAN network.

Also provided is a computer program product, comprising a computer usable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "operating", "processing", "computing", "selecting", "generating", or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Prior art

Prior art

Prior art

Prior art FIGS. 4A-4B are simplified block diagram illustrations of a 2-tier hierarchical system as described in U.S. Pat. No. 5,729,826.

Prior art

Prior art

FIGS. 11a-11e are diagrams of supporting hierarchical cellular system architecture in LTE, all in accordance with respective embodiments of the present invention.

FIGS. 12A-12B, taken together, form a table of terms used herein.

Figure 1:
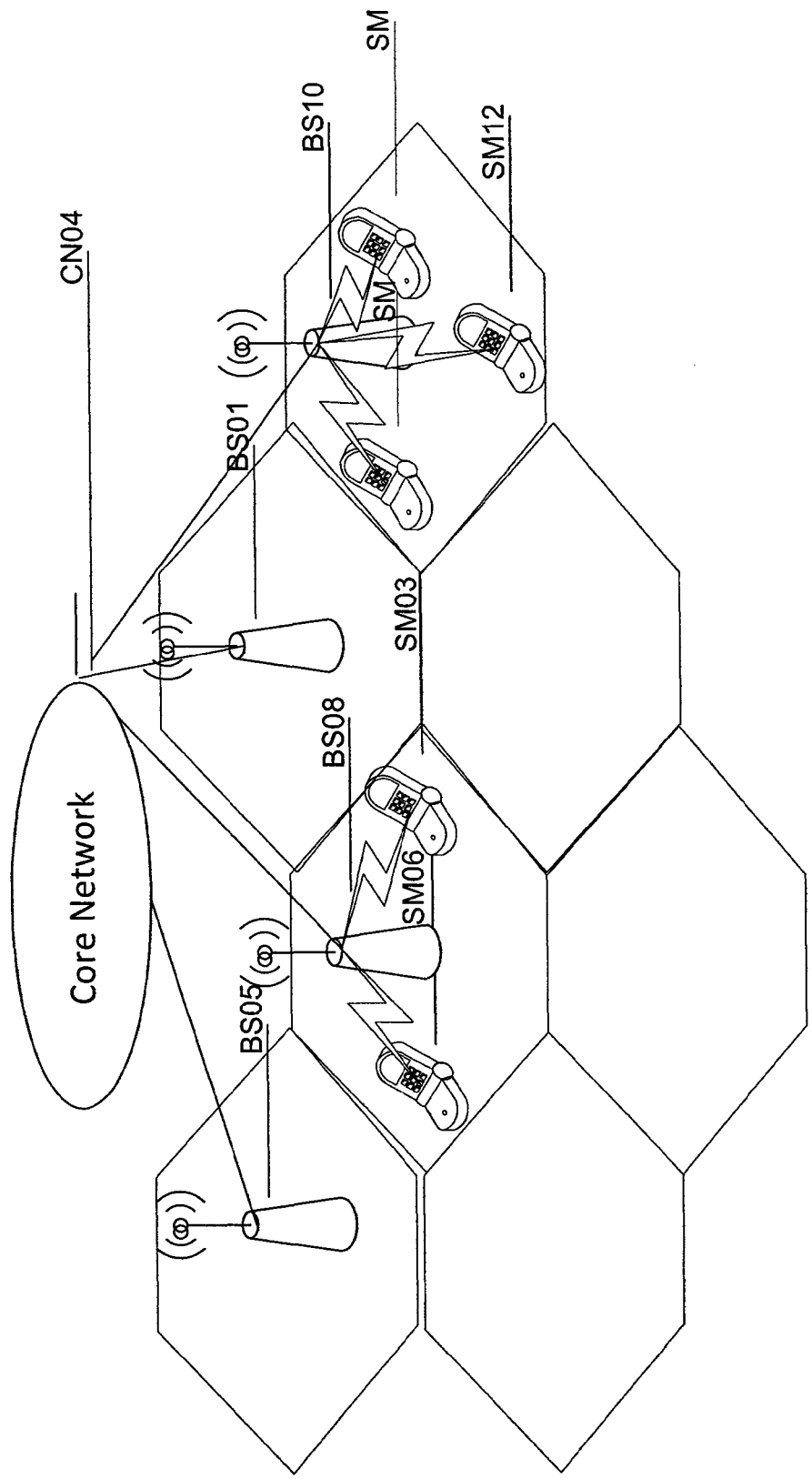
FIG. 1 is a semi-pictorial diagram of a conventional cellular system.
Figure 2:
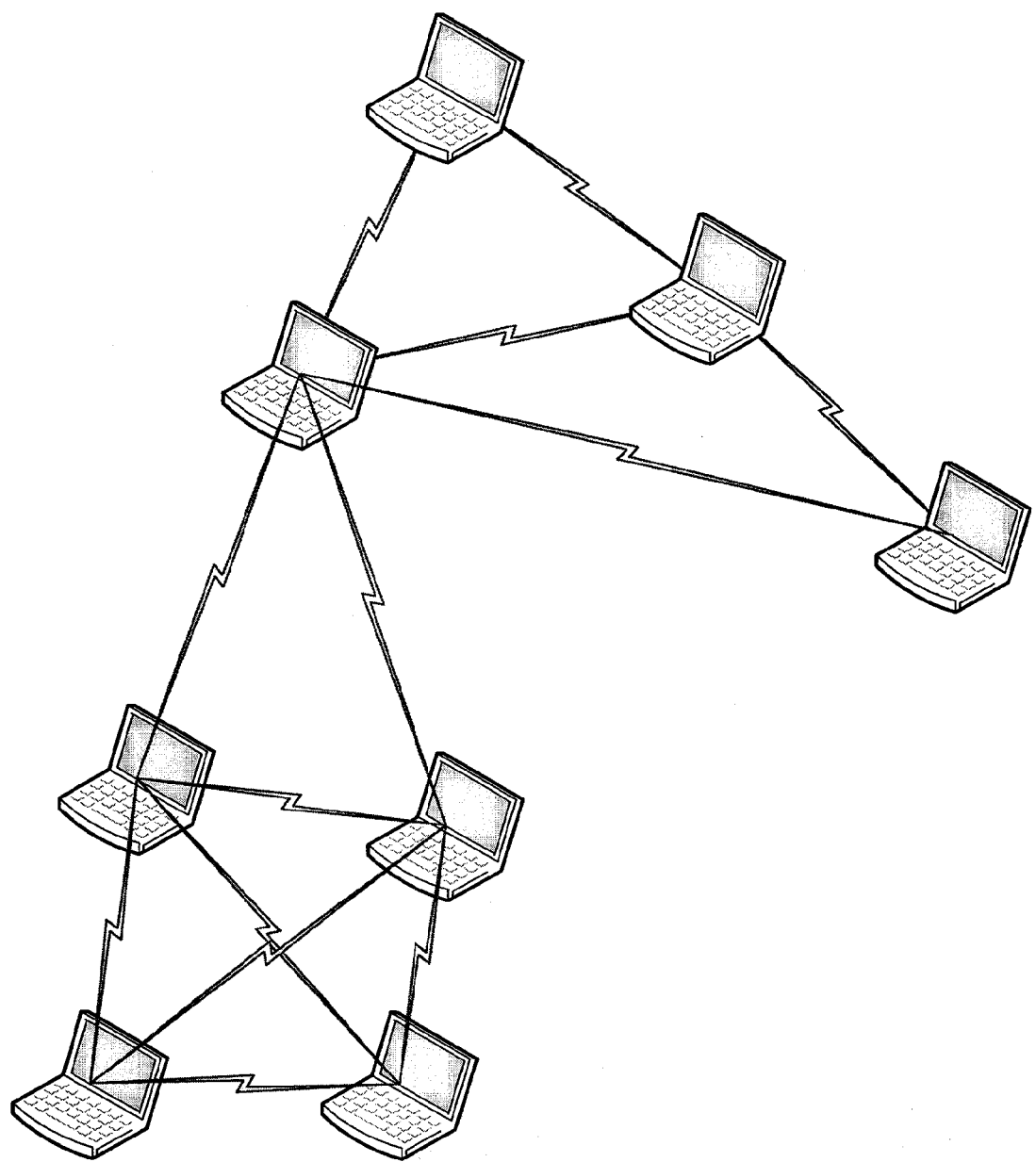
FIG. 2 is a semi-pictorial diagram of a mobile ad-hoc network system.

In the drawings, M or m denotes a message and P denotes a sub-process or sub-method.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 5:
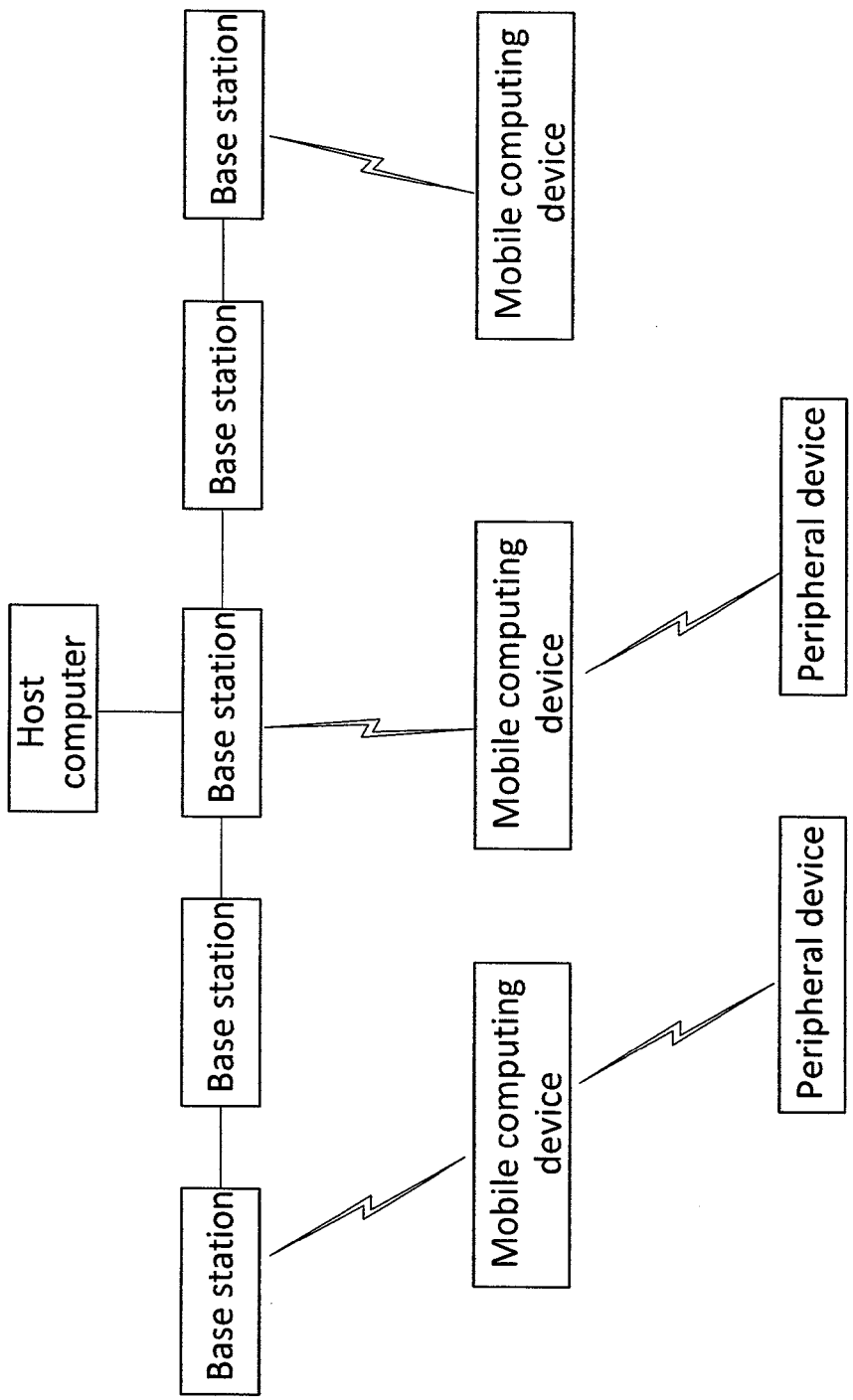
FIG. 5 is a simplified block diagram illustration of a 2-tier hierarchical LAN as described in U.S. Pat. No. 5,657,317.

The terms used herein such as but not limited to the following terms, may be construed either in accordance with any definition thereof appearing in the prior art literature or in accordance with the specification or drawings, or as follows:

active link: If nodes are actually transferring data between them, the link between them is termed an "active link". In some technologies e.g. 4G, a link is sometimes established as an active link in advance i.e. before it is actually needed to transfer data.

base station: The term "base station", which may be mobile or stationary, is intended to include, for example, a cellular base station such as but not limited to a 2G, 3G, 4G, or mobile Wimax cellular base station, as well as a wireless access point such as but not limited to a WiFi, Bluetooth or WiMax access point.

cellular: The term "cellular" is intended to include WiFi and other technologies which have a single cell i.e. access point. It is appreciated that access points may be interconnected outside the scope of the cellular network, e.g. via ADSL.

connected: Two network nodes are "connected" if they are capable of transferring data between them, e.g. over a wired or wireless link.

core: a management and switching functionality which typically includes but is not limited to some or all of the following functionalities: (1) activates connections between, ultimately, mobile communication devices; this functionality is sometimes termed "gateway" or "serving gateway", (2) mobility management of mobile stations, (3) policy and/or QOS enforcement, (4) user and/or equipment authentication. It is appreciated that the core may be co-located with a base station e.g. if the base station is an access point. In addition, the core may include one or more computerized subsystems each of which perform one or more of the functionalities described above. Alternatively, several computerized subsystems together perform one of the functionalities above.

downlink: link from core toward mobile communication device i.e. a link in a sequence or route (also termed downlink sequence or down-route) of one or more links connecting the core to the device.

establish a link: activate a link i.e. cause a link to become active hierarchical cellular network: a communication network wherein at least one mobile communication device is served by a first base station, also termed herein a "relay", which communicates with the core via a sequence of $L>=1$ linked base stations including: (a) optionally, $L-1$ base stations connected to one another hence also termed herein "relays", and (b) a second base station which is connected to the core.

radio interface: apparatus using radio technology to provide a link.

relay: see definition of "hierarchical network"

relay apparatus: synonymous to "relay"

mobile communication device: synonymous to "mobile communicator". The term "mobile computing device", e.g. in FIG. 5, is used herein to include any mobile communication device being a node in a communication network such as a cellular communication network, such as but not limited to a mobile telephone e.g. cellphone, smartphone, etc., as well as any computer that has a wireless modem such as a laptop with a LTE modem or a wireless tablet. It is appreciated that while many mobile communication devices have computing ability, the embodiments shown and described herein are applicable also to mobile communication devices which lack computing ability.

served by: connected via an active link to uplink: link from a mobile communication device toward the core i.e. a link in a sequence or route (also termed uplink sequence or up-route) of one or more links connecting the device to the core.

The term "relay" is used herein to include a static or mobile node in a cellular communication network:

(a) whose node has both base station functionality and backhauling link functionality, e.g. via mobile communicator functionality. By way of example, backhauling link functionality is presented herein as mobile communicator functionality but the invention is not limited only to this type of backhauling link type and is also applicable, mutatis mutandis, to other suitable communication link/networks including other cellular or non-cellular communication links/networks such as but not limited to 2G, 3G, WiFi, WiMax or microwave point-to-point links;

(b) and which is operative to serve mobile communicators, such as cellular telephones, or other relays, and to be linked to or served by base stations or other relays. Typically, each relay communicates via antennae with the mobile communicators and includes a first radio manager, and base station functionality which has a physical back-connection to the first radio manager. The first radio manager typically has a physical connection with the relay's backhauling link functionality, e.g. via mobile communicator functionality which in turn communicates via antennae with at least one selectable (static) base station. Typically, the first radio manager comprises a radio resource manager and functionality for receiving information from, and sending information to, other radio managers, respectively co-located with other relays, and for using the information to determine whether to reject at least one mobile communicator seeking to be served by an individual base station associated with the individual co-located radio manager.

A particular problem characterizing mobile communication systems in which some mobile communicators communicate indirectly with the base stations, is thin-ness of the uplinks connecting the mobile communicators with the base stations. Certain embodiments of the present invention are helpful in overcoming this problem.

Mobile communication systems in which some mobile communicators are beyond-range of, hence communicate indirectly with, the base stations, typically include a core associated with base stations, mobile communicators which may or may not be within range of the base stations, and communication relaying mobile stations which have some or all of the functionalities of both base stations and mobile communicators. Mobile communication systems in which some mobile communicators communicate indirectly with the base stations are known in the art, e.g. any of the embodiments described in co-pending Published PCT Patent Application WO/2011/092698, entitled "Cellular Communication System With Moving Base Stations And Methods And Apparatus Useful In Conjunction Therewith".

When single-hop communication is used, a communication relaying mobile station is within the range of a base station and has a mobile communicator within its own range. When multi-hop communication is used, a chain of n>=2 communication relaying mobile stations are provided, the first of which, 1, is within the range of a base station, the last of which, n, has a mobile communicator within its own range, and each adjacent pair I, i+1 of which, for I=1, . . . n−1, is characterized in that the (i+1)'th communication relaying mobile station is within the range of the I'th communication relaying mobile station.

Hierarchical mobile systems useful in conjunction with certain embodiments of the present invention are known and are, for example, shown in U.S. Pat. Nos. 5,729,826 and 5,657,317 and in co-pending Published PCT Patent Application WO/2011/092698, entitled "Cellular Communication System With Moving Base Stations And Methods And Apparatus Useful In Conjunction Therewith".

Figure 7:
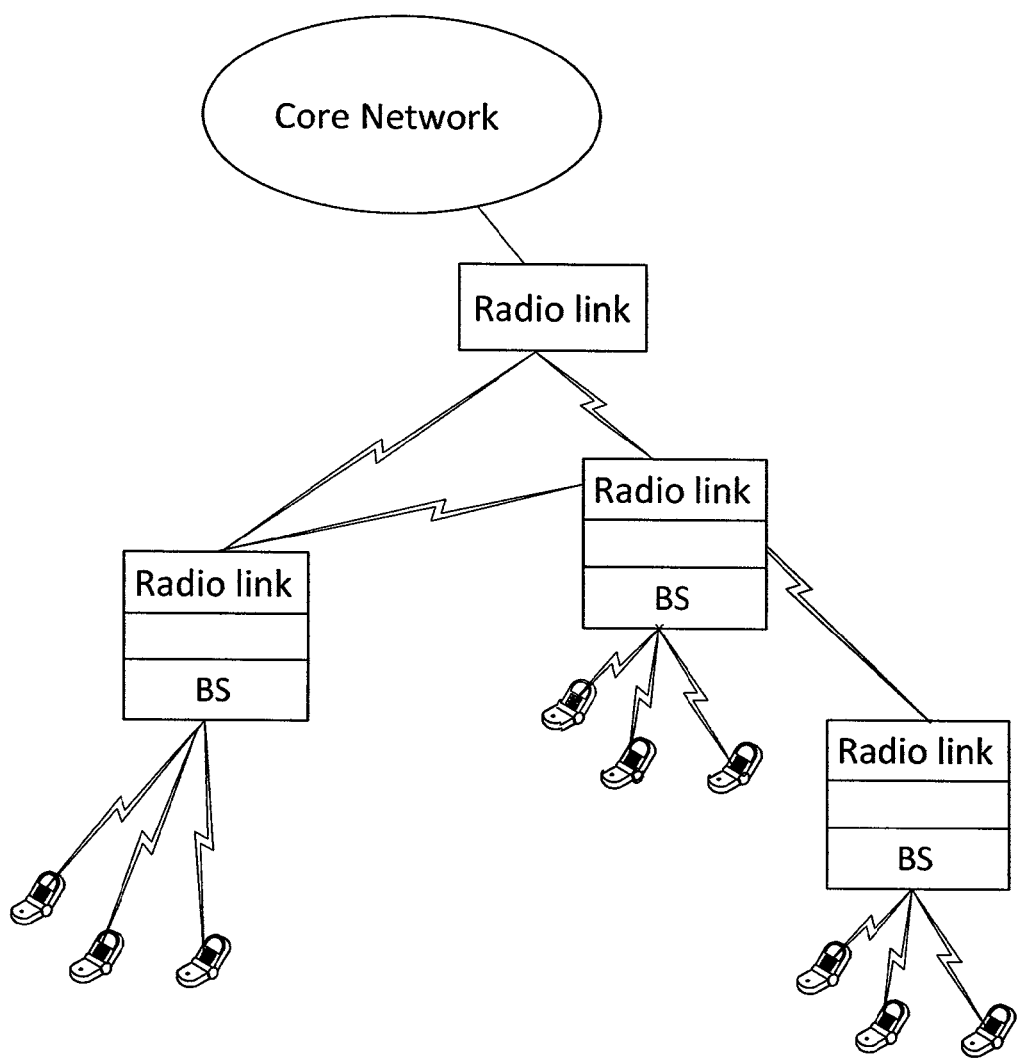
FIG. 7 is a semi-pictorial diagram of an N-tier hierarchical radio-link cellular system network constructed and operative in accordance with certain embodiments of the present invention, where N may be more than 2.

Specifically, a particularly suitable hierarchical radio-link network, for implementing certain embodiments of the invention shown and described herein, is illustrated in FIG. 7 of the above-referenced PCT Application. U.S. Pat. No. 5,729,826 describes a 2-tier hierarchical cellular network, where the RAs move with traffic and communicate with the core via fixed radio ports. The RAs are provided with a high gain directional antenna. An example of a suitable network of this type is illustrated in prior art FIGS. 4A-4B. A moving base station may have an RH added to the processor block. U.S. Pat. No. 5,657,317 describes a 2-tier hierarchical LAN. The first tier may comprise a hard wired LAN comprising radio base stations. The second tier may include a variety of roaming computer devices such as vehicle terminals and computer terminals to peripheral devices that can bind to the mobile computing device and communicate with different devices on the LAN. An example of a suitable network of this type is illustrated in prior art FIGS. 4A-4B of the present application.

Figure 6A:
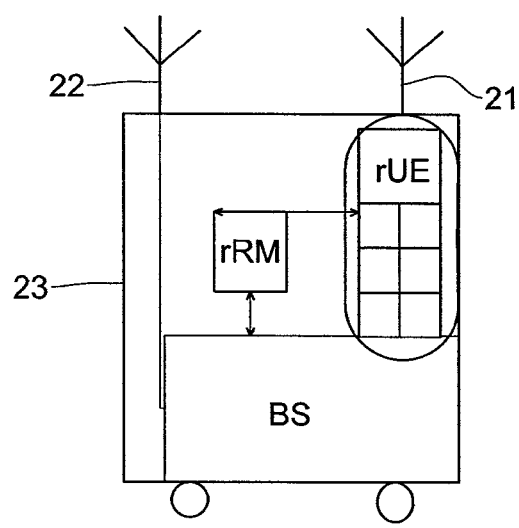
FIGS. 6A-6B are semi-pictorial diagrams of an n-tier hierarchical in-band multi-hop cellular network, using SM as a backhauling device.
Figure 6B:
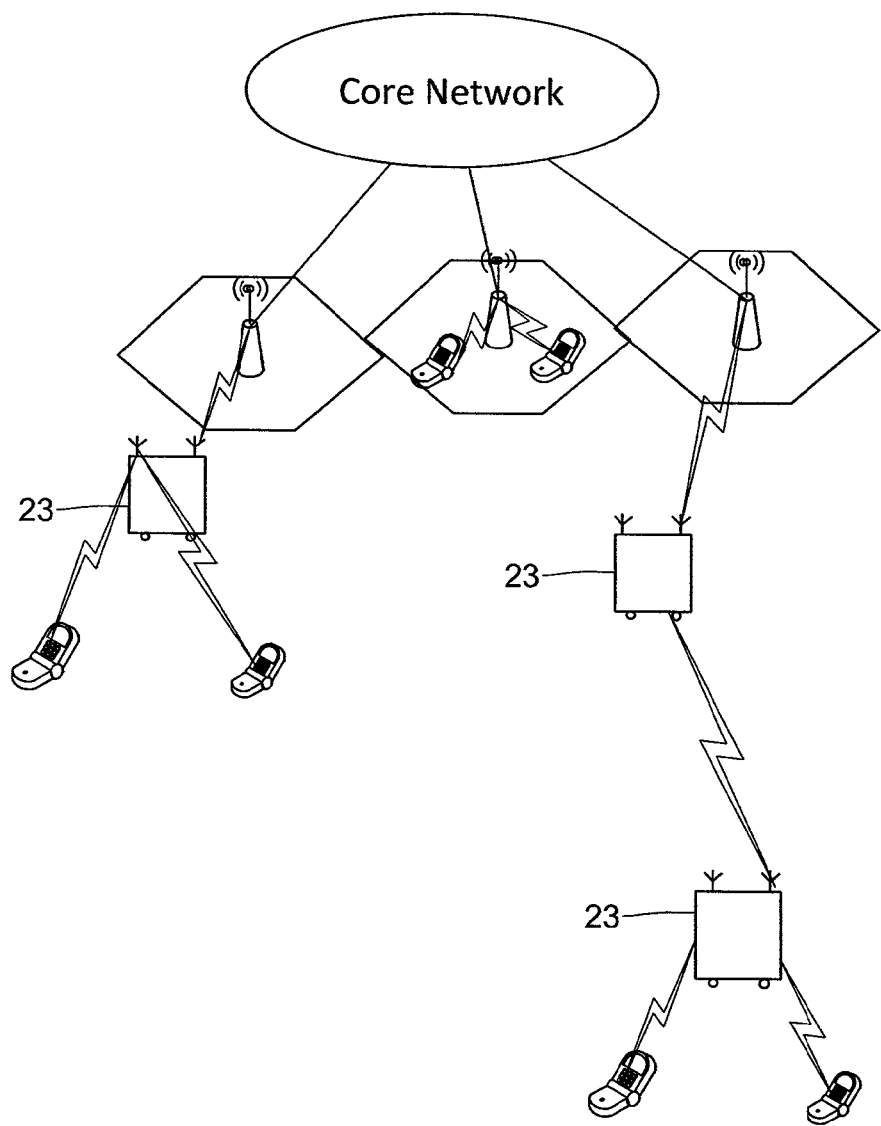

The above-mentioned co-pending published PCT Patent Application illustrates an n-tier hierarchical in-band multi-hop cellular network using SM as a backhauling device as illustrated in FIGS. 6a-6b of the above-mentioned co-pending published PCT Patent Application. The RH may be added to the rRM block.

An N-tier hierarchical radio-link network, as depicted in FIG. 7 of the present application, uses a radio interface for backhauling, giving higher uplink BW capacity and better range cover.

A dynamic hierarchical cellular system, e.g. as in FIG. 7 of the present application, typically has some or all of the following capabilities which are typically not applicable in a conventional cellular system:

a. Finding the route to SM through several hops. Due to the dynamics of the system, when a message is being routed from source to destination, there is uncertainty in the position of the destination when the message arrives; moreover, there is uncertainty in the correctness of the routing route because several nodes along the route may change their position.

b. Traffic 'bottlenecks' occur at a certain point along the backhauling route. A typical cellular system does not consider bottlenecks along the backhauling route. In a hierarchical cellular system, because of limitations in the backhauling BW, bottlenecks might occur. For example, consider that several distant users are using an RA that is connected to another RA that might be almost overloaded due to other distant users. The result of these bottlenecks is low utilization of the radio channels and an unsatisfying user experience.

c. Using a dynamic hierarchical cellular system adds two variables to the routing graph, number of hops and link quality. These two variables change rapidly, due to the dynamics of the system, and affect the utilization of the system. Hops increase delay, and link quality affects the backhauling BW.

d. Service management through several hops. Different services have different requirements; for example, services such as voice calls are not tolerated to latency, but require little BW; services like web browsing are tolerated to latency but are high BW consumers. In order to be able to support these kinds of services, different service requirements and their mutual effect on each other are taken into account. In some cases, interfaces might interfere with each other, for example when they share the same limited resource, such as uplink BW on a specific route. In such cases, the more important service request is typically given advantage.

e. Scheduling of the different services. Different services have different characteristics. Some use a constant bit rate and are not tolerated to delays, such as voice calls, and others are tolerated to delays, but are very 'greedy' in their BW consumption, and work in bursts. Once the services have been established, a special scheduler, which resides in the RA, may schedule their requests according to their service requirements. Moreover, different priorities may be assigned to different service requests. In such cases, the more important request should have advantage in the resource scheduler.

f. Handover management in case of a backhauling link failure

The system of FIG. 7 may be combined with any of the following embodiments which may also operate stand-alone or with any suitable conventional cellular communication network managing system as appropriate:

Routing using topology graph in the RS (centralistic approach) is now described.

RS Typically builds a topology graph in order to control the routing process.

Figure 8A:
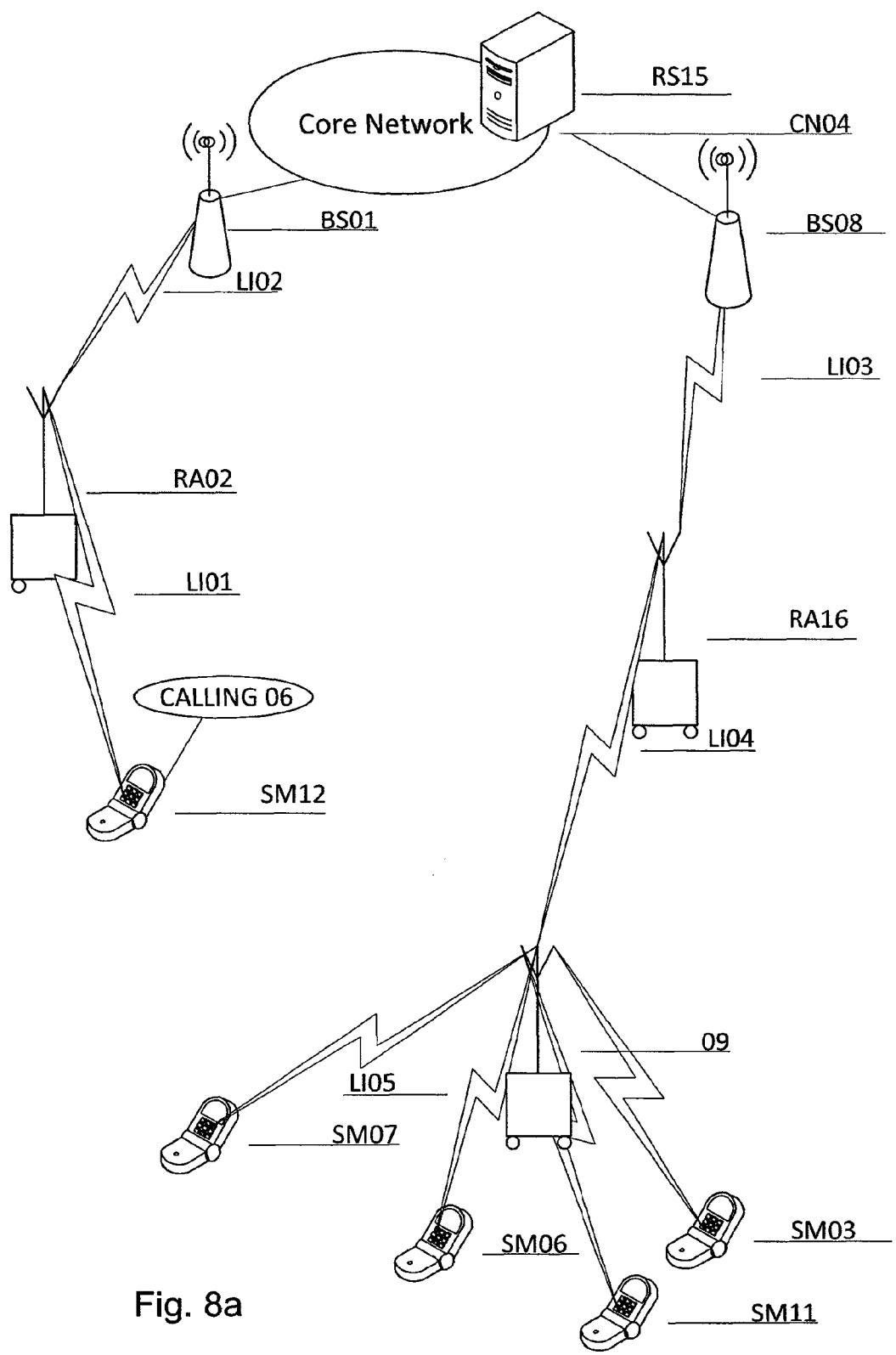
FIGS. 8A-8B are semi-pictorial diagrams of a routing scheme using a centralistic router for a multi-hop hierarchical cellular network system, all constructed and operative in accordance with certain embodiments of the present invention.
Figure 8B:
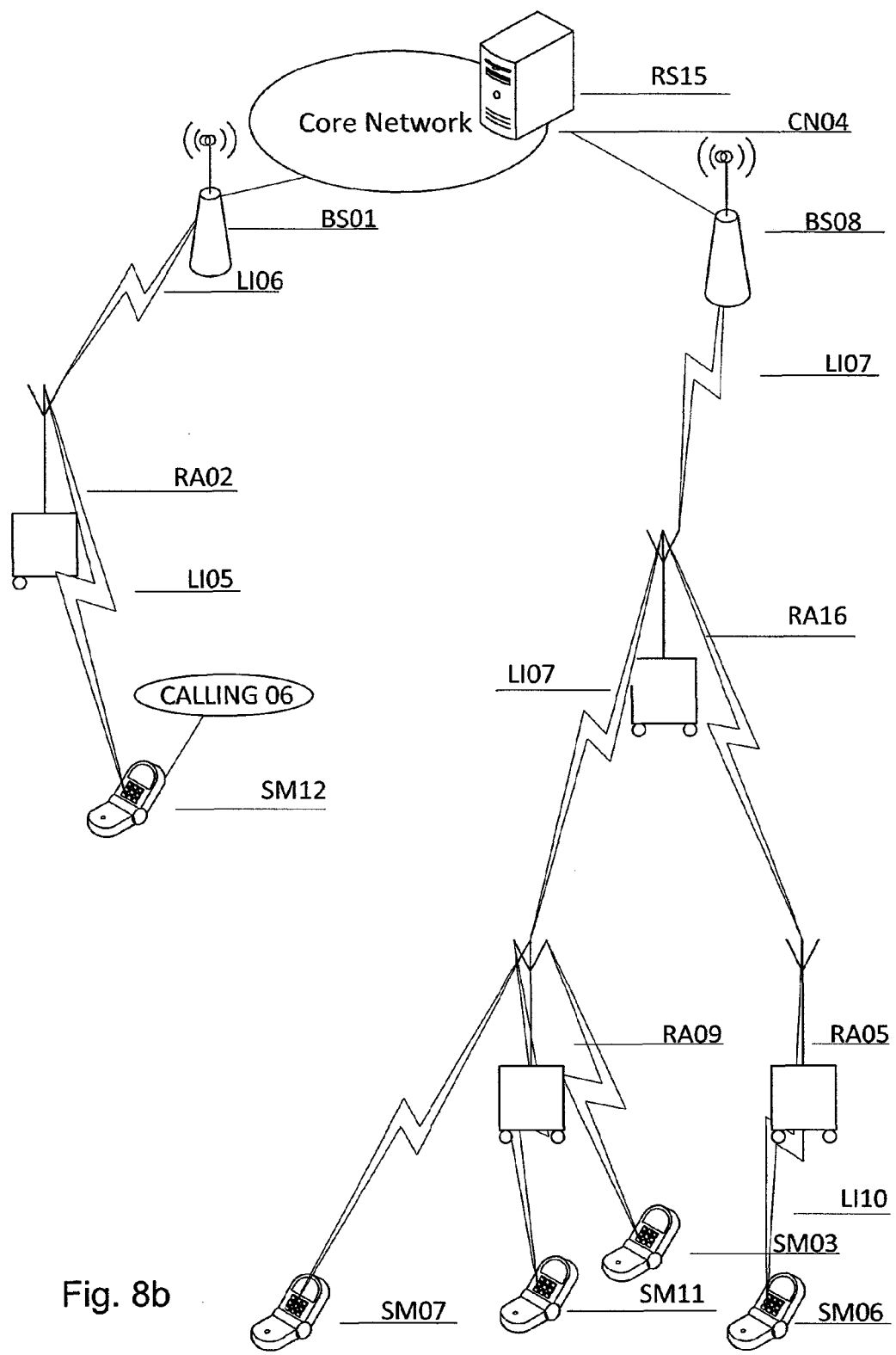

FIGS. 8A and 8B depict a usage of topology graph inside the RS in order to establish a call between SM12 and SM06. When the destination is reached, an acknowledge message is sent back to RS. An error might be indicated by a timeout on the acknowledge message or when receiving a 'nack' destination unreachable message.

In case of an error, any suitable method may be employed, such as but not limited to a suitable method from among the following:

1. Broadcasting the message to all available destinations
2. Broadcasting the message to the last known branch
3. Broadcasting the message to the last known destination and its neighbors
4. Broadcasting a page message to all available destinations
5. Broadcasting a page message to the last known branch
6. Broadcasting a page message to the last known destination and its neighbors
7. Combining several options in several iterations In case of an error, the destination is re-identified, and once the destination is found, RS updates its routing tables as depicted in step 20.

Broadcasting the real message is faster than sending a paging message; when using the paging message, the destination transmits an 'ack' message to the RS, and only then the actual message is transmitted to its destination. On the other hand, broadcasting the real message overloads network links, due to transmission of an unnecessary data message, which is larger than a paging message.

In FIG. 8a, the following links/components may provide the following functionalities:

LI01:
1: Calling 06
13: ack call establishment
LI02:
2: calling 06
12: ack call establishement through RA02
RS15:
3: SEARCHING FOR 06
4: establish call for 06 through BS08 RA16, RA09
11: ack call establishement for 12 through BS01, RA02
LI03
5: Establish call to 06 through RA16, RA09
10: ack call establishment
LI04
6: Establish call to 06 through RA09
9: ack call establishement
LI05
7: Establish call to 06
8: ack call establishement
The RS15 routing table may be as follows:
Destination: Route
SM12: BS01→RA02
SM07: BS08→RA16→RA09
SM06: BS08→RA16→RA09
SM11: BS08→RA16→RA09
SM03: BS08→RA16→RA09

In FIG. 8b, the following links/components may provide the following functionalities:

LI05
1: Calling 06
22: ack call establishemnt
LI06
2: calling 06
21: ack call establishement through RA02
RS15
4: searching for 06
5: establish call for 06 through BS08 RA16, RA09
12: broadcast call establishment to 06 through BS08, RA16
19: ack call establishement for 12 through BS01, RA02
20. update graph topology
LI07
6: Establish call to 06 through RA16, RA09
11: nack call to 06
13: broadcast call establishment to 06 through RA16
18. ack call establishment
RA19
14: broadcast call establishment 06
LI09
14: broadcast call establishment to 06
17: ack call establishment
LI08
7: Establish call to 06 through RA09
10: nack call to 06
14: broadcast call establishment to 06
RA09
15: broadcast call establishment 06
RA06
15: broadcast call establishment 06
LI10
16: ack call establishment
RS15
Routing table:
Destination: Route
SM12: BS01→RA02
SM07:BS08→RA16→RA09
SM11:BS08→RA16→RA09
SM03:BS08→RA16→RA09
SM06:BS08→RA16→RA09
SM06:BS08→RA16→RA05

Routing using local routing manager in the RA (distributed approach), according to certain embodiments, is now described, with reference to FIGS. 9A-9b, 15a-16b.

Figure 9A:
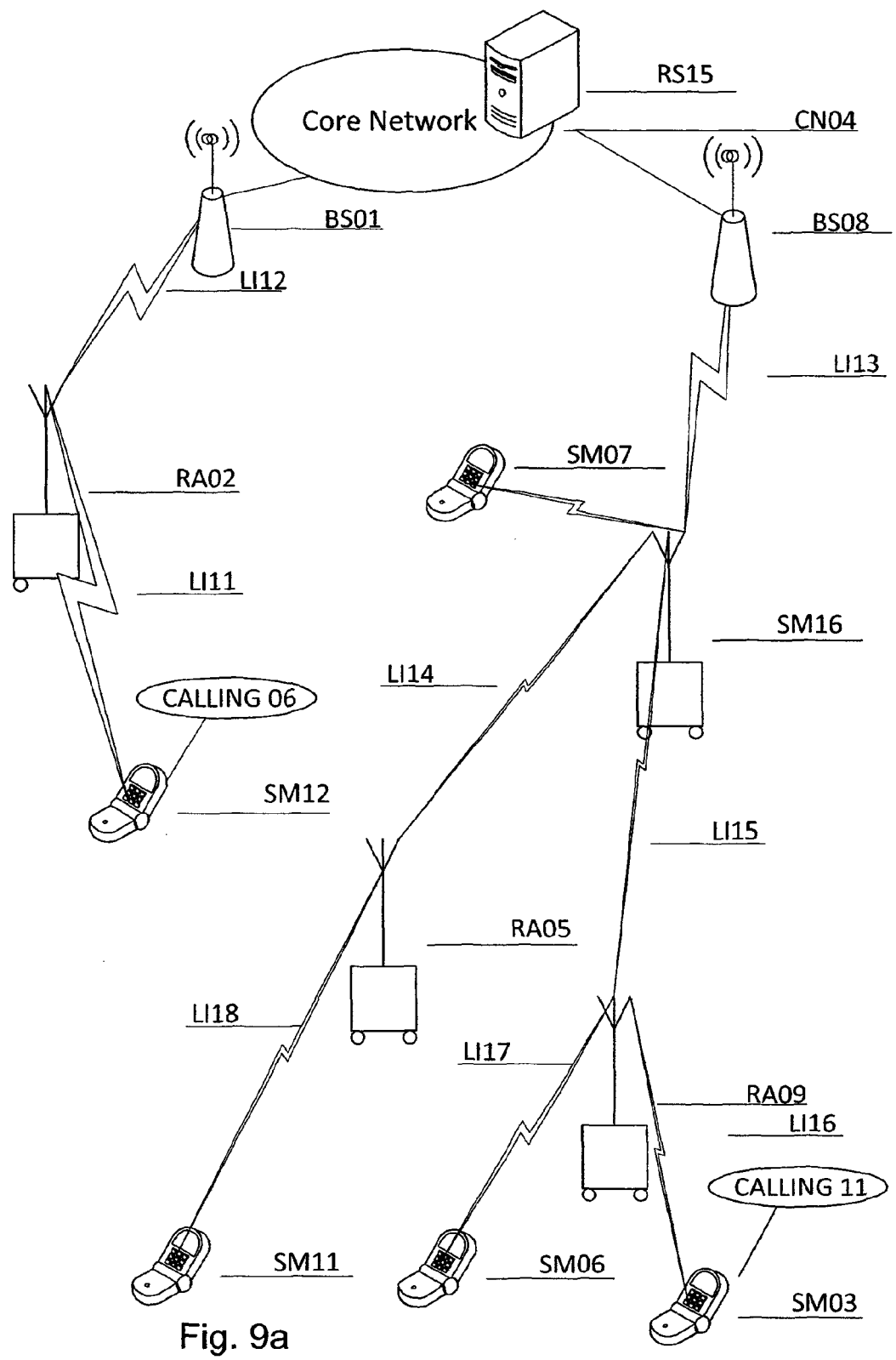
FIGS. 9A-9B are semi-pictorial diagrams of a routing scheme using a distributed router for a multi-hop hierarchical cellular network system, all constructed and operative in accordance with certain embodiments of the present invention.

In FIG. 9a, the following links/components may provide the following functionalities:

LI11
1: Calling 06
14: ack call establishemnt

RA02
Routing table:
Destination: Next
SM12: *
SM07:BS01
SM06:BS01
SM11:BS01
SM03:BS01
LI12
2: calling 06
13: ack 12
BS01
Routing table:
Destination: Next
SM12: RA02
SM07:RS
SM06:RS
SM11:RS
SM03:RS
BS08
Routing table:
Destination: Next
SM12: RS
SM07:RA16
SM06:RA16
SM11:RA16
SM03:RA16
LI13
5: calling 06
10: ack 12
SM16
Routing table:
Destination: Next
SM12: BS08
SM07:*
SM06:RA09
SM11:RA05
SM03:RA09
LI14
17: Calling 11
20: ack 03
LI15
6: calling 06
9: ack 12
16: calling 11
21 ack 03
RA09
Routing table:
Destination: Next
SM12: BS08
SM07:RA16
SM06:*
SM11:RA16
SM03:*
LI16
15: Establish call 11
17: ack call establishment
LI17
7: Establish call to 06
8: ack 12
RA05
Routing table:
Destination: Next
SM12: BS08
SM07:RA16
SM06:RA16

SM11:*
SM03:RA16
LI18
18: Establish call to 11
19: ack 03

In FIG. 9a, the following links/components may provide the following functionalities:
LI17
1: Calling 06
16: ack call establishemnt
LI18
2: calling 06
15: ack 12
RA01
Routing table:
Destination: Next
SM12: *
SM07:BS01
SM06:BS01
SM11:BS01
SM03:BS01
BS01
3: calling 06
14: ack 12
Routing table:
Destination: Next
SM12: RA02
SM07:RS
SM06:RS
SM11:RS
SM03:RS
RS15
4: calling 06
13: ack 12
Routing table:
Destination: Next
SM12: BS01
SM07:BS08
SM06:BS08
SM11:BS08
SM03:BS08
BS08
Routing table:
Destination: Next
SM12: RS
SM07:RA16
SM06:RA16
SM11:RA16
SM03:RA16
LI19
5: calling 06
12: ack 12
LI20
20: ack call establishment
RA16
8: broadcasting calling 06
13: update tables
19: broadcasting calling 07
21:update tables
Routing table:
Destination: Next
SM12: BS08
SM07:?→*
SM06:RA09→RA05
SM11:RA05
SM03:RA09

LI21
6: calling 06
9: unknown 06
14: update table
22: update table
LI22
8: broadcasting calling 06
11: ack 12
18: broadcasting calling 07
21: ack 11
RA05
9: broadcasting calling 06
11: update table 18 broadcasting calling 07
21: update table
Routing table:
Destination: Next
SM12: BS08
SM07:?→RA07
SM06:?→*
SM11:*
SM03:RA16
LI25
17: calling 07
21: ack calling establishment
LI24
10: ack 12
RA09
7: broadcasting 06
15: update table
23: update table
Routing table:
Destination: Next
SM12: BS08
SM07:?→RA16
SM06:?→RA16
SM11:RA16
SM03:*
LI23
15: Establish call 11
17: ack call establishment In routing using the local routing manager alternative, as depicted in FIG. 9A, each node, or only RA, comprises a local routing manager which holds the "next" routing table for each destination. Typically, this is implemented in that the table contains a row for each destination indicating the next hop, in order to reach its destination. Alternatively, each node holds a routing table only to its descendents, while other destinations are routed by default through the RS. Another alternative is that each node holds only its relative neighborhood graph, e.g. as described in Toussaint in "*The Relative Neighborhood Graph Of A Finite Planner Set*", Pattern Recognition, vol. 12 No. 4 (1980).

Figure 10:
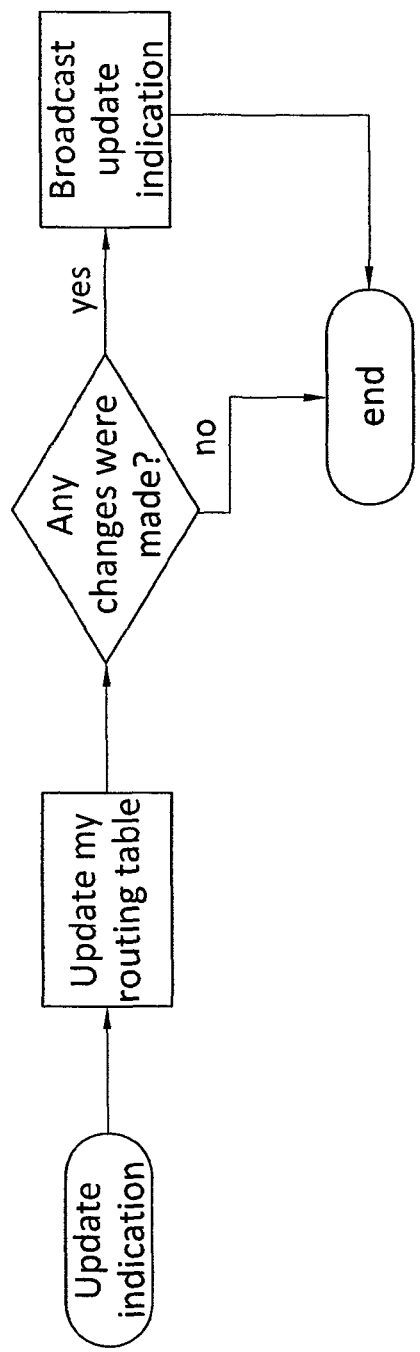
FIG. 10 is a simplified flowchart illustration of a broadcasting selective update routing table indication method, operative in accordance with certain embodiments of the present invention.

The routing table updates are broadcast throughout the entire network. Optionally, the updates are sent only to the nodes that were affected by the change. FIG. 10 depicts a method to broadcast only to the affected neighbors.

When the destination is reached an 'ack' message is sent back to the creator of the message. An error might be indicated by a timeout on the 'ack' message, or when receiving a 'nack' [destination unreachable] message.

Figure 3:
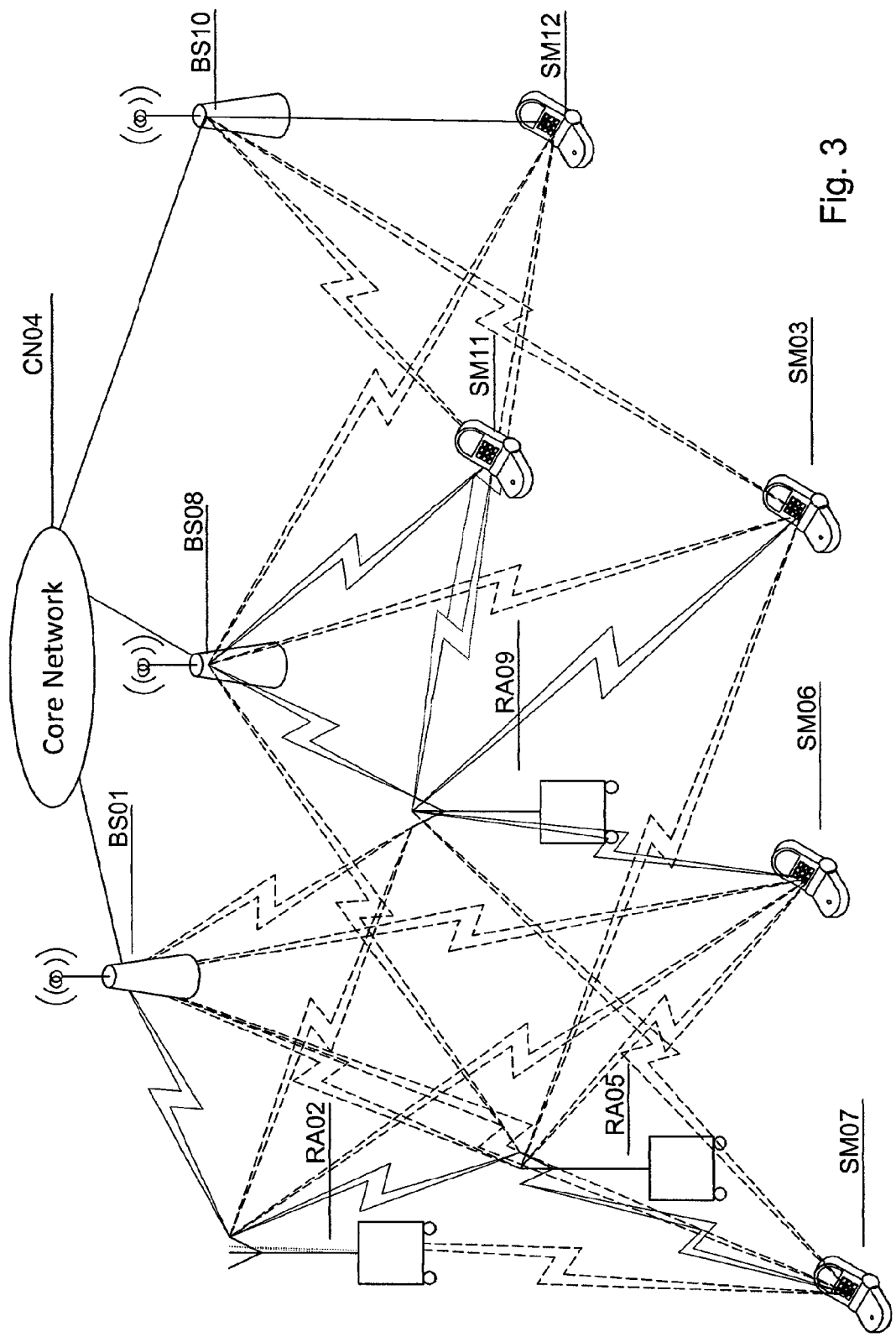
FIG. 3 is a semi-pictorial diagram of an n-level hierarchical cellular system of the invention.
Figure 9B:
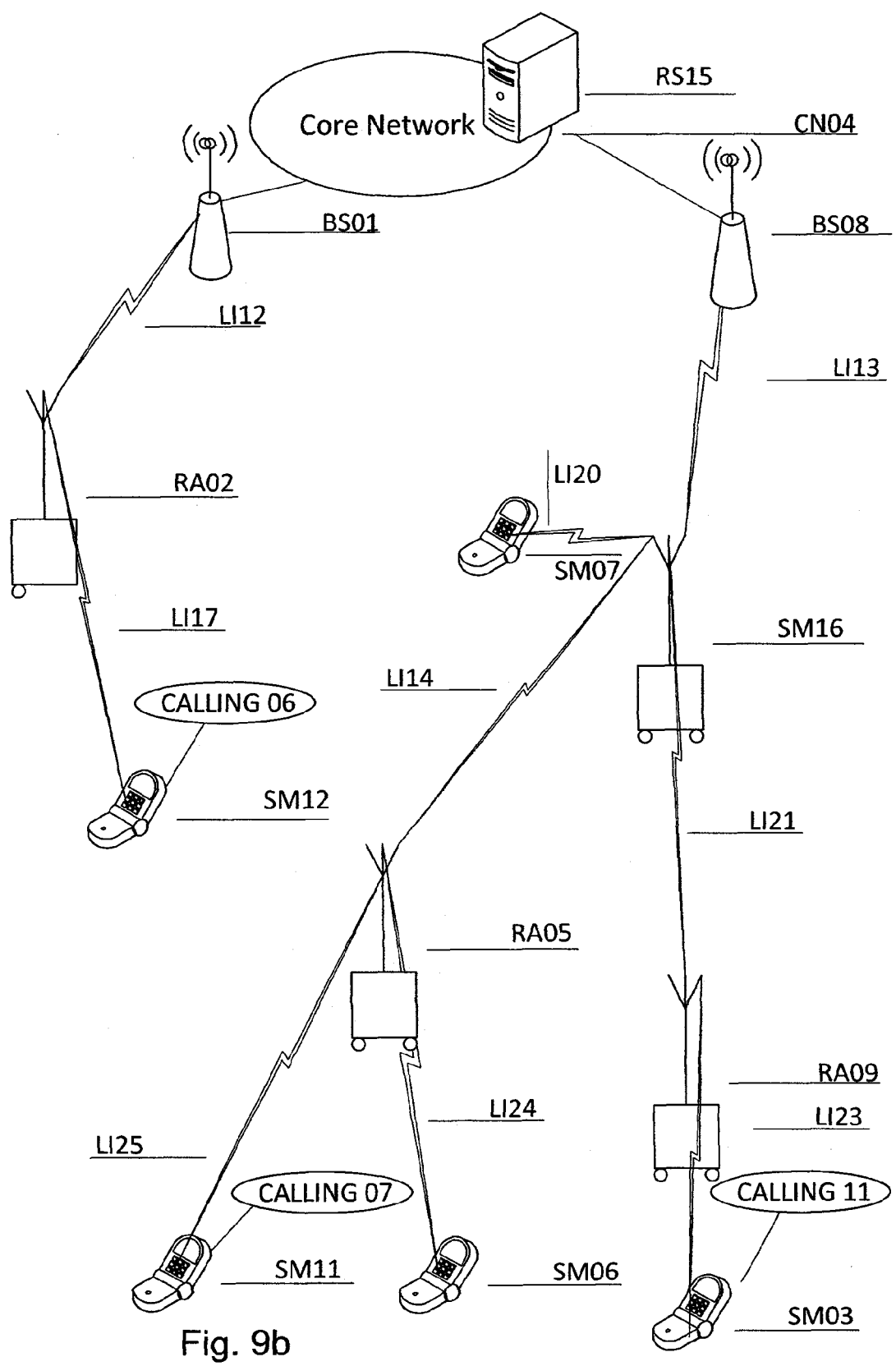

In case of an error, any or all of the following methods may be introduced:
1. Broadcasting the message to all available destinations
2. Broadcasting the message to the last known branch, e.g. as per FIG. 11b
3. Broadcasting the message to the last known destination and its neighbors
4. Broadcasting a page message to all available destinations
5. Broadcasting a page message to the last known branch
6. Broadcasting a page message to the last known destination and its neighbors
7. Combining several options in several iterations In case of an error when destination is found, the local routing tables are updated, as depicted in FIG. 9b in steps 11, 13, 15, 21, 22 and 23.

Distributed embodiments, while more complex than centralistic embodiments, are particularly useful in applications in which any of the following are important: avoiding single point of failure, in case of disconnection from the core, the network may still be able to give service; robustness to changes, only small fraction of the changes affect the entire network; faster, no need to broadcast the error all the way to the core.

Supporting hierarchical cellular system architecture in LTE, according to certain embodiments, is now described.

Figure 11A:
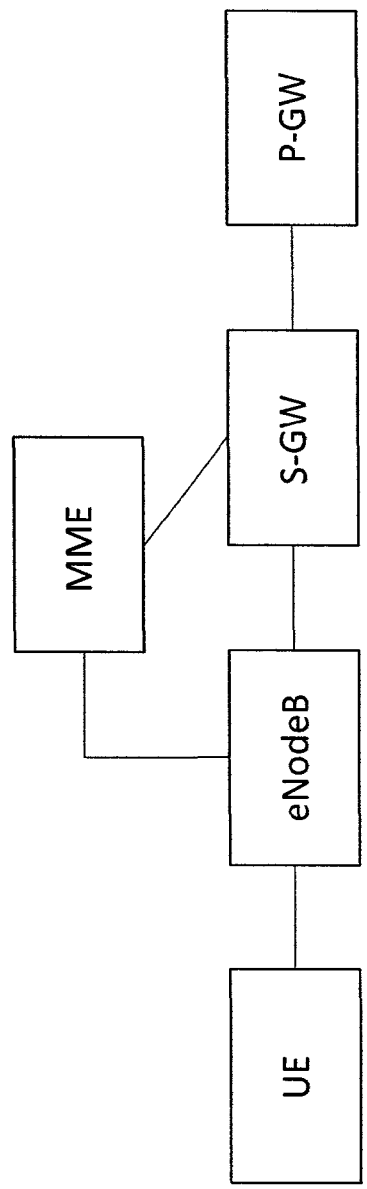

Conventional LTE cellular system architecture is depicted in FIG. 11a, comprising user equipment, UE, a base station, eNodeB, mobility management entity (MME), serving gateway, S-GW and packet data network gateway, P-GW. There are many alternatives to implement a hierarchical cellular system in LTE as depicted in FIGS. 11b-11e. The UE may compromise all or many functionalities of an SM and the eNodeB may compromise all or many functionalities of a BS.

FIG. 11b depicts implementation of a hierarchical cellular system using a relay server (RS) that is connected to a Relay MME and the P-GW gateway. The relay MME from the point of view of the core is a conventional MME that can be connected to a conventional MME as an alternative MME. The relay MME is responsible for controlling signaling between the core network and the UE for UEs that are camping on a RA or to the control signals that are related to RA themselves. The relay server is responsible for specific hierarchical network implementations, such as network optimizations algorithms, routing algorithms and message coupling\decoupling.

Figure 11C:
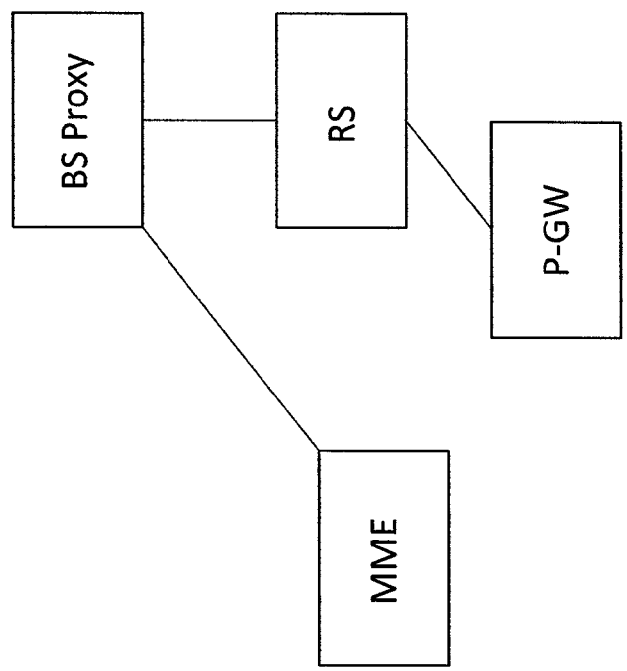

FIG. 11c depicts another alternative of implementation of a hierarchical cellular system in LTE. The difference in relation to FIG. 20b is that the RS is connected to a virtual BS or a BS proxy that serves as a conventional BS from the core point of view, and an RA from the RS point of view. The RS is responsible for handling all tasks in the first option, in addition to handling mobility and controlling of the RAs.

FIG. 11d depicts another alternative of implementation of a hierarchical cellular system in LTE. This alternative is quite different from the first two alternatives. The filter relay server entity resides between the RA or the BS and the core and is responsible to filter messages that come from entities that reside in a hierarchical network, and entities that reside in the typical cellular network. Messages that come from a typical cellular network are forwarded as usual, while relay messages are forwarded to a BS proxy which is responsible for decoupling them and sending them as a usual system message to the MME.

Figure 11E:
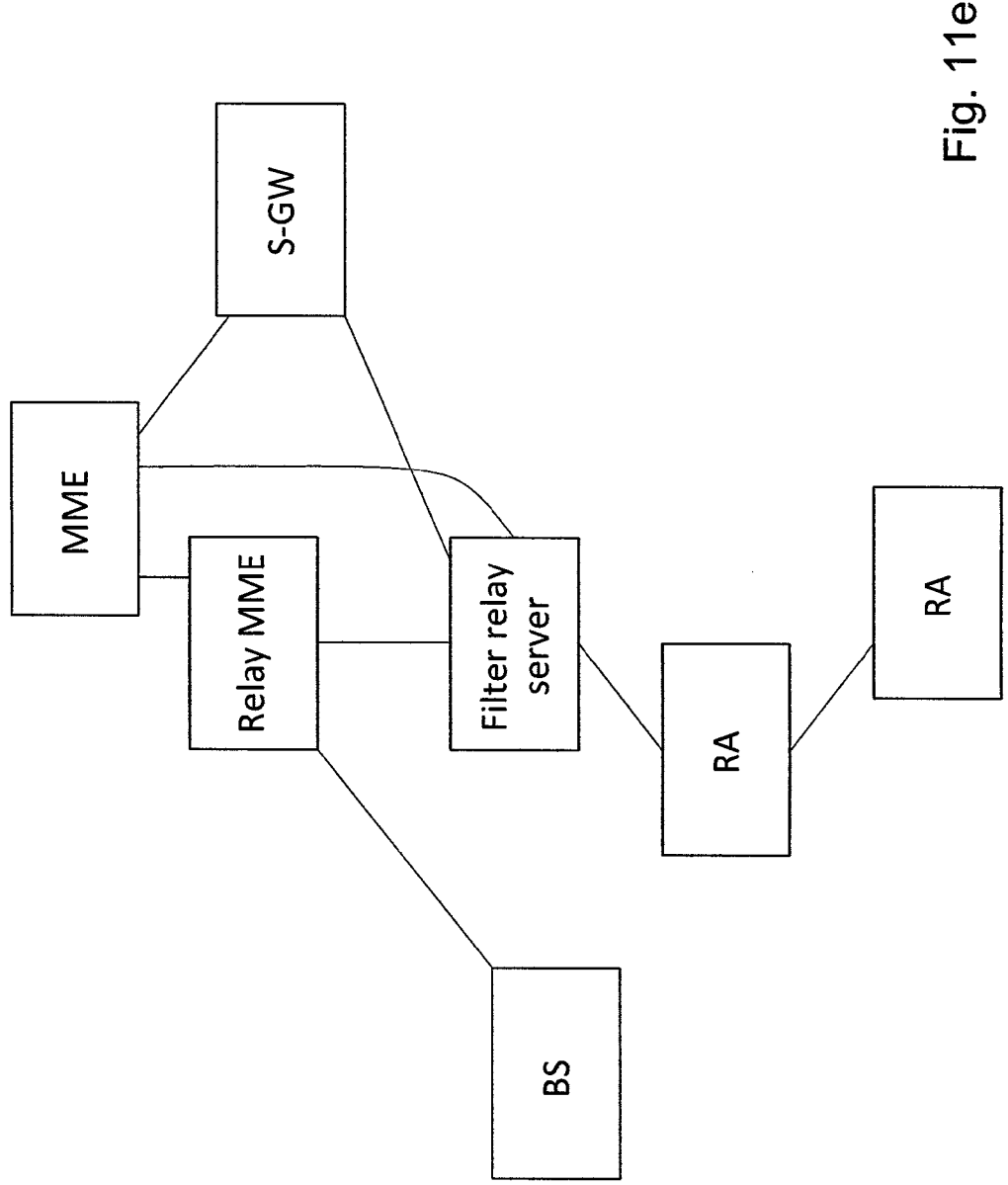

FIG. 11e depicts another alternative of implementation of a hierarchical cellular system in LTE.

This alternative uses the same filter relay server entity as in FIG. 11d. Relay messages are forwarded to the relay MME, while other messages are forwarded as usual. The relay MME comprises both methods that were part of the relay MME in FIG. 11c, and also methods that were part of the RS in FIG. 11c.

More generally, according to certain embodiments, a relay apparatus is provided, including a relay manager and a set of radio interfaces operative, when said relay is disposed at a level n of a cellular network having a core, to provide a corresponding set of uplinks from said relay to at least one node disposed at least one level in the network which is closer to the core than level n and a corresponding set of downlinks from said at least one node to said relay.

Alternatively or in addition, the relay apparatus may include a relay manager; and a set of radio interfaces operative, when said relay is disposed at a level n of a cellular network having a core, to provide a corresponding set of uplinks to said relay from at least one node disposed at least one level in the network which is further from the core than level n; and a corresponding set of downlinks from said relay to said at least one node.

Optionally, the apparatus also comprises a second set of radio interfaces operative, when said relay is disposed at a level n of a cellular network having a core, to provide a corresponding second set of uplinks to said relay from at least one node disposed at least one level in the network which is further from the core than level n; and a corresponding second set of downlinks from said relay to said at least one node.

This enables to enlarge the overall network capacity by adding more DL resources to the relay.

A suitable data relaying method may include providing a relay manager and a set of radio interfaces; disposing said relay at a level n of a cellular network having a core so as to provide a corresponding set of uplinks from said relay to at least one node disposed at least one level in the network which is closer to the core than level n and a corresponding set of downlinks from said at least one node to said relay.

Optionally, said set of uplinks and downlinks connect said relay to a single node disposed at a level in the network which is closer to the core than level n.

Optionally, said set of uplinks and downlinks connect said relay to a set of more than one nodes disposed at least one level in the network which is closer to the core than level n.

Optionally, said set of uplinks and downlinks connect said relay to a corresponding set of nodes disposed at least one level in the network which is closer to the core than level n.

The term Relay MME typically refers to manager functionality establishing and controlling operation of the links between a relay and all nodes served thereby. Typically, links are established as per a link establishment command generated by a link establishment initiator which may be incorporated into a processor-based "relay server" which may also incorporate other functionalities.

MME in LTE protocol is an example of a mobility manager for a cellular network.

Optionally, a hierarchical cellular network administration system is provided which is operative to administrate for a hierarchical cellular network, the system comprising a link establishment initiator operative to generate link establishment commands; and relay manager functionality operative to establish links between each of at least one relays in the cellular network and all nodes in said cellular network served thereby as per said link establishment commands generated by the link establishment initiator and to control operation of the links.

Optionally, said link establishment initiator is incorporated within a server located in the core of the network and wherein said server is also operative to control the core's mobility manager including causing the mobility manager to provide said relay manager functionality.

Optionally, the system may also comprise a hierarchical/non-hierarchical information pre-processor, wherein said network includes at least one non-hierarchical base station which is operative to communicate with mobile communication devices and not with relays and at least one hierarchical base station which communicates with at least one relay and wherein said core includes a mobility manager and a serving gateway communicating with said mobility manager and, via said hierarchical/non-hierarchical information pre-processor, with at least one base station, said hierarchical/non-hierarchical information pre-processor being operative to receive information from at least one non-hierarchical base station and from at least one hierarchical base station and to send information received from hierarchical base stations, but not information from non-hierarchical base stations, to the relay manager functionality.

Optionally, said hierarchical/non-hierarchical information pre-processor is also operative to cause said information from non-hierarchical base stations to be processed as if said network were a non-hierarchical network having no relays.

The term "Hierarchical network" is intended to include any network having at least one relay uplinking to a base station and downlinking, directly or ultimately (i.e. via other relays) to at least one cellular communication device, such that the network supports more than 2 levels or tiers of wireless communication namely core-base station, at least one relay, communication device, as opposed to conventional networks including 2 or less levels or tiers e.g. a core, base station, relay incapable of linking to another relay e.g. incapable of providing multi-hop functionality, and mobile communication device.

The term "multi-hop functionality" is intended to include applications in which a mobile communication device communicates with a base station via more than one relay.

The term "non-hierarchical base station" may include base stations which do not support multi-hop functionality and/or may include base stations which communicate only with mobile communication devices.

The term "hierarchical base station" is intended to include base stations which do support multi-hop functionality and/or may include base stations which communicate not only with mobile communication devices but also with relays.

Optionally, the system also comprises core functionality providing a core for a cellular communication network and communicating with nodes of the network via a system of core-topmost node links.

Optionally, communication between said link establishment initiator, said relay manager functionality and nodes in said network occurs via said system of core-topmost node links.

According to certain embodiments, a mobile communication management system may be provided, serving a mobile communication network having linked nodes, the nodes including a core, base stations and mobile communication devices, thereby to define a topology of communication links between said nodes, the system comprising a topology server which includes a topology learner which dynamically learns the topology and a topology storing functionality which stores the topology as at least one topology map structured as a hierarchy of depth exceeding 2.

The network may comprise a multi-layer hierarchical cellular network. An example of a suitable multi-layer hierarchical cellular network is described herein with reference to FIG. 7.

Typically, said topology server resides in a single node within said network. Typically, said single node in which said topology server resides comprises the core.

Typically, said server stores the topology as a hierarchy of dynamic depth.

Typically, said server uses said topology to dynamically route information through the downlinks to arrive at a desired destination.

Typically, said server dynamically routes by indicating network nodes via which the information is to arrive at the desired destination.

According to certain embodiments, the topology server is centrally located and a "flooding" operation is performed if a destination node such as a mobile communicator is not found at a topological location identified by the server. In "flooding", a broadcast such as actual data packets or a paging message seeking the destination to which to send the actual data packets, goes out to the entire network in order to find the "lost" destination node. Alternatively, in "semi-flooding", the broadcast goes out to only a subset of the network, such as only to nodes geographically or topologically adjacent to the "lost" destination node. Sending only a paging message rather than the data itself results in low latency i.e. slowness but lessens the load on the network, and is particularly, but not exclusively, suited for data (non-voice) applications. Conversely, sending, not merely a paging message, but rather the data itself, results in high latency, but increases the load on the network, and is particularly, but not exclusively, suited for voice applications.

Typically, the server broadcasts data packets intended for a destination node not found at a topological location identified by the server, to at least some base stations in the topology, each of which broadcast to at least some of their "children" nodes in the topology. It is appreciated that the term "at least some" as used throughout the present specification and claims is also, of course, intended to include the special instance of "at least one".

Typically, the server broadcasts the data packets intended for the not-found destination node to all base stations in the topology, and each of said base stations broadcasts to all of their "children" nodes in the topology.

Typically, said not-found destination node sends an 'ack' to his father node in the topology and said 'ack' is transmitted through the topology to the topology server. Typically, said data packets store voice information.

Typically, the topology defines a set of nodes and wherein the server broadcasts data packets intended for the not-found destination node only to a subset of said set of nodes which subset is characterized in that its nodes are adjacent topologically to the topological location identified by the server as having belonged to the destination node.

Typically, the topology defines a set of nodes wherein the server broadcasts data packets intended for the not-found destination node only to a subset of said set of nodes which subset is characterized in that its nodes are adjacent geographically to the topological location identified by the server as having belonged to the destination node.

Typically, the server broadcasts the paging message intended to locate a destination node not found at a topological location identified by the server, to at least some base stations in the topology, each of which broadcasts to at least some of their "children" nodes in the topology.

Typically, the server broadcasts the paging message intended to locate the not-found destination node to all base stations in the topology, and each of said base stations broadcasts the paging message to all of their "children" nodes in the topology. Typically, said not-found destination node sends an 'ack' to his father node in the topology and said 'ack' is transmitted through the topology to the topology server.

Typically, only upon receipt of said 'ack', data packets intended for said destination node which sent said 'ack', are sent to said destination node.

Typically, said data packets sent only upon receipt of said 'ack', store non-voice data.

Typically, the topology defines a set of nodes, wherein the server broadcasts the paging message intended to locate the not-found destination node only to a subset of said set of nodes whose subset is characterized in that its nodes are adjacent topologically to the topological location identified by the server as having belonged to the destination node.

Typically, the topology defines a set of nodes, wherein the server broadcasts the paging message intended to locate the not-found destination node only to a subset of said set of nodes whose subset is characterized in that its nodes are adjacent geographically to the topological location identified by the server as having belonged to the destination node.

According to certain embodiments, the topology server is distributed through the network, rather than being centrally located in a single topological location in the network, such as the core.

Typically, said topology server is distributed over a plurality of nodes within said network such that least one topology map representing at least a portion of the topology of the network resides within each of said plurality of nodes.

Typically, each relay includes a topology map including a list of at least some of its descendants and at least some of the routing information required to get to the descendants.

Typically, each relay positioned at a particular level in the hierarchy includes a topology map including a list of all of its descendants, and routing information which identifies, for each individual descendant in said list, a topological location within the next level of the hierarchy to which to proceed, if it is desired to reach said individual descendant but does not identify all topological locations in all levels through which to proceed in order to reach said individual descendant.

Typically, at least one individual node from among said plurality of nodes over which said topology server is distributed is operative to receive a report indicating that data packets have failed to reach a destination node not found at a topological location identified by at least one of said individual node and a descendant thereof, and responsively, to broadcast said data packets to at least some of said individual node's "children" nodes.

Typically at least one individual node from among said plurality of nodes over which said topology server is distributed is operative to receive a report indicating that data packets have failed to reach a destination node not found at a topological location identified by at least one of said individual node or a descendant thereof, and responsively, to broadcast a paging message intended to locate said not-found destination node, to at least some of said individual node's "children" nodes.

Typically, said individual node is located in the core.

Typically, said at least one individual node comprises several nodes which are not located in the core.

The terms in the table of FIG. 12 may be construed either in accordance with any definition thereof appearing in the prior art literature or in accordance with the specification, or as stipulated in the table.

The present invention is intended to include a base station effecting any portion of any of the functionalities shown and described herein.

The present invention is also intended to include a handset effecting any portion of any of the functionalities shown and described herein.

It is appreciated that various embodiments of the invention e.g. as shown and described herein are useful in conjunction with a mobile communication network system operative in conjunction with a core network including a core device and at least one static base station, the system comprising a plurality of base stations; and a population of mobile stations communicating via antennae with the base stations; the base stations including at least one moving base station which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable static base station, wherein the first radio manager comprises a radio resource manager; and functionality for receiving information from, and sending information to, other radio managers, respectively co-located with other moving base stations, and for using the information to determine whether to reject at least one mobile station seeking to be served by an individual base station associated with the individual co-located radio manager.

It is appreciated that various embodiments of the invention e.g. as shown and described herein are suitable for multi-hop applications in which at least one relay is served by another relay rather than being served directly by a base station.

It is appreciated that various embodiments of the invention e.g. as shown and described herein are suitable for application to a wide variety of mobile communication technologies. For example:

3GPP Long Term Evolution (LTE), is a standard in mobile network technology which provides the following features:

Peak download rates of 326.4 Mbit/s for 4×4 antennae, and 172.8 Mbit/s for 2×2 antennae (utilizing 20 MHz of spectrum).[8]

Peak upload rates of 86.4 Mbit/s for every 20 MHz of spectrum using a single antenna. [8]

Five different terminal classes have been defined from a voice centric class up to a high end terminal that supports the peak data rates. All terminals will be able to process 20 MHz bandwidth.

At least 200 active users in every 5 MHz cell. (Specifically, 200 active data clients)

Sub-5 ms latency for small IP packets

Increased spectrum flexibility, with supported spectrum slices as small as 1.4 MHz and as large as 20 MHz (W-CDMA requires 5 MHz slices, leading to some problems with roll-outs of the technology in countries where 5 MHz is a commonly allocated amount of spectrum, and is frequently already in use with legacy standards such as 2G GSM and cdmaOne.) Limiting sizes to 5 MHz also limited the amount of bandwidth per handset.

In the 900 MHz frequency band to be used in rural areas, supporting an optimal cell size of 5 km, 30 km sizes with reasonable performance, and up to 100 km cell sizes supported with acceptable performance. In city and urban areas, higher frequency bands (such as 2.6 GHz in EU) are used to support high speed mobile broadband. In this case, cell sizes may be 1 km or even less.

Support for mobility. High performance mobile data is possible at speeds of up to 350 km/h, or even up to 500 km/h, depending on the frequency band used.[9]

Co-existence with legacy standards (users can transparently start a call or transfer data in an area using an LTE standard, and, should coverage be unavailable, continue the operation without any action on their part using GSM/GPRS or W-CDMA-based UMTS or even 3GPP2 networks such as cdmaOne or CDMA2000).

Support for MBSFN (Multicast Broadcast Single Frequency Network). This feature can deliver services such as Mobile TV using the LTE infrastructure, and is a competitor for DVB-H-based TV broadcast.

The features of E-UTRAN, the air interface of LTE, are:

Peak download rates up to 292 Mbit/s and upload rates up to 71 Mbit/s depending on the user equipment category.

Low data transfer latencies (sub-5 ms latency for small IP packets in optimal conditions), lower latencies for handover and connection setup time than with previous radio access technologies.

Support for terminals moving at up to 350 km/h or 500 km/h depending on the frequency band.

Support for both FDD and TDD duplexes as well as half-duplex FDD with the same radio access technology.

Support for all frequency bands currently used by IMT systems by ITU-R.

Flexible bandwidth: 1.4 MHz, 3 MHz, 5 MHz 15 MHz and 20 MHz are standardized.

Support for cell sizes from tens of meters radius (femto and picocells) up to 100 km radius macrocells Simplified architecture: The network side of EUTRAN is composed only by the enodeBs Support for inter-operation with other systems (e.g. GSM/EDGE, UMTS, CDMA2000, WiMAX . . . )

Packet switched radio interface.

It is appreciated that various embodiments of the invention e.g. as shown and described herein are suitable for application to LTE and/or EUTRAN technology as well as to technologies possessing some but not all of the above features.

LTE Advanced is a 4th generation standard (4G)[2] of radio technologies designed to increase the capacity and speed of mobile telephone networks. Its features may include some or all of:

Relay Nodes

UE Dual TX antenna solutions for SU-MIMO and diversity MIMO

Scalable system bandwidth exceeding 20 MHz, Potentially up to 100 MHz

Local area optimization of air interface

Nomadic/Local Area network and mobility solutions

Flexible Spectrum Usage

Cognitive radio

Automatic and autonomous network configuration and operation

Enhanced precoding and forward error correction

Interference management and suppression

Asymmetric bandwidth assignment for FDD

Hybrid OFDMA and SC-FDMA in uplink

UL/DL inter eNB coordinated MIMO

It is appreciated that various embodiments of the invention e.g. as shown and described herein are suitable for application to LTE-Advanced technology as well as to technologies possessing some but not all of the above features.

WiMAX (Worldwide Interoperability for Microwave Access) is a telecommunications protocol that provides fixed and fully mobile Internet access. Features include:

Adding support for mobility (soft and hard handover between base stations). This is seen as one of the most important aspects of 802.16e-2005, and is the very basis of Mobile WiMAX.

Scaling of the Fast Fourier transform (FFT) to the channel bandwidth in order to keep the carrier spacing constant across different channel bandwidths (typically 1.25 MHz, 5 MHz, 10 MHz or 20 MHz). Constant carrier spacing results in a higher spectrum efficiency in wide channels, and a cost reduction in narrow channels. This is also known as Scalable OFDMA (SOFDMA). Other bands not multiples of 1.25 MHz are defined in the standard, but because the allowed FFT subcarrier numbers are only 128, 512, 1024 and 2048, other frequency bands will not have exactly the same carrier spacing, which might not be optimal for implementations.

Advanced antenna diversity schemes, and hybrid automatic repeat-request (HARQ)

Adaptive Antenna Systems (AAS) and MIMO technology

Denser sub-channelization, thereby improving indoor penetration

Introducing Turbo Coding and Low-Density Parity Check (LDPC)

Introducing downlink sub-channelization, allowing administrators to trade coverage for capacity or vice versa Adding an extra QoS class for VoIP applications.

It is appreciated that various embodiments of the invention e.g. as shown and described herein are suitable for application to WiMax technology as well as to technologies possessing some but not all of the above features.

Reference is made again to FIG. 8a. FIG. 8a is an example, according to an embodiment of the present invention, of a communication between SM12 and SM06, SM12 is connected to the core network through RA02 using communication radio link [LI01], and RA02 is connected to the core network through BS01 using communication radio link LI02. In a similar way SM06 connects to the core network through RA09, RA16 and BS08.

In this example SM12 initiates a communication session with SM06 by, for example, calling SM06. The request is forwarded through RA02, BS01 over radio links LI01 and LI02 to the core network through the relay server. SM06 is searched and located as attached to RA09. A communication link or path to SM06 is established in 3-hops using LI03, LI04 and the radio link between SM06 and its serving base station RA09, LI05. After the communication link between the core and SM06 has been established, an acknowledgement message is typically sent to SM12 using the communication link between SM12 and the core. After the communication link between SM12 and SM06 has been established, they are able to communicate.

FIGS. 13a-14b depict an example message sequence of components, based on the scenario of FIG. 8a, suitable for supporting a packet in a particular flow. To create a bearer to support the specific requirements (e.g. some or all of jitter, priority, delay) of the flow and the privilege of the user, the protocol may be based on the 3GPP LTE standard.

Figure 13A:
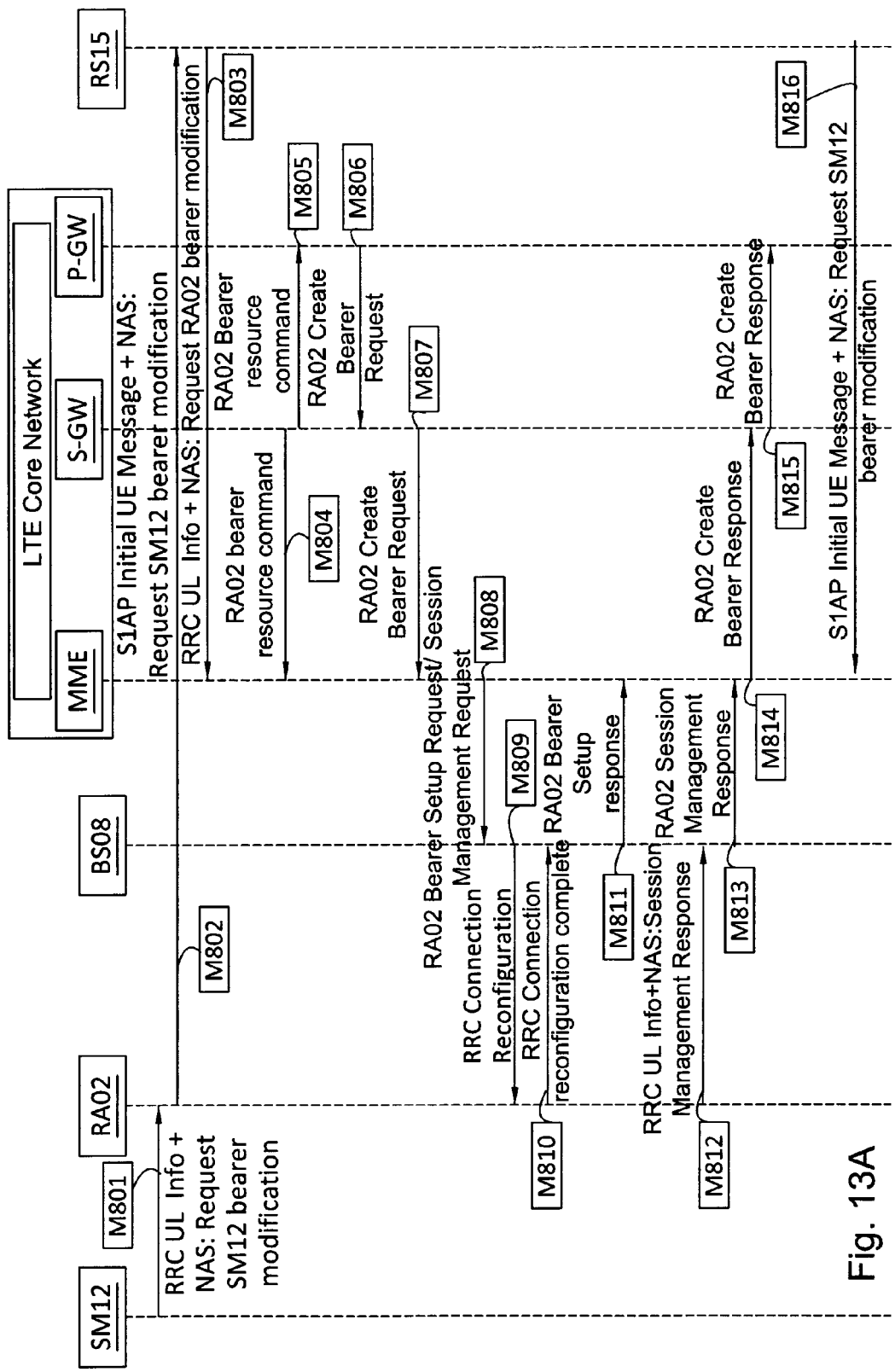
FIGS. 13a-13b, 14a-14b are diagrams of message description bearer setup procedures in LTE for a multi-hop hierarchical cellular network system using a centralistic router, all constructed and operative in accordance with certain embodiments of the present invention.
Figure 13B:
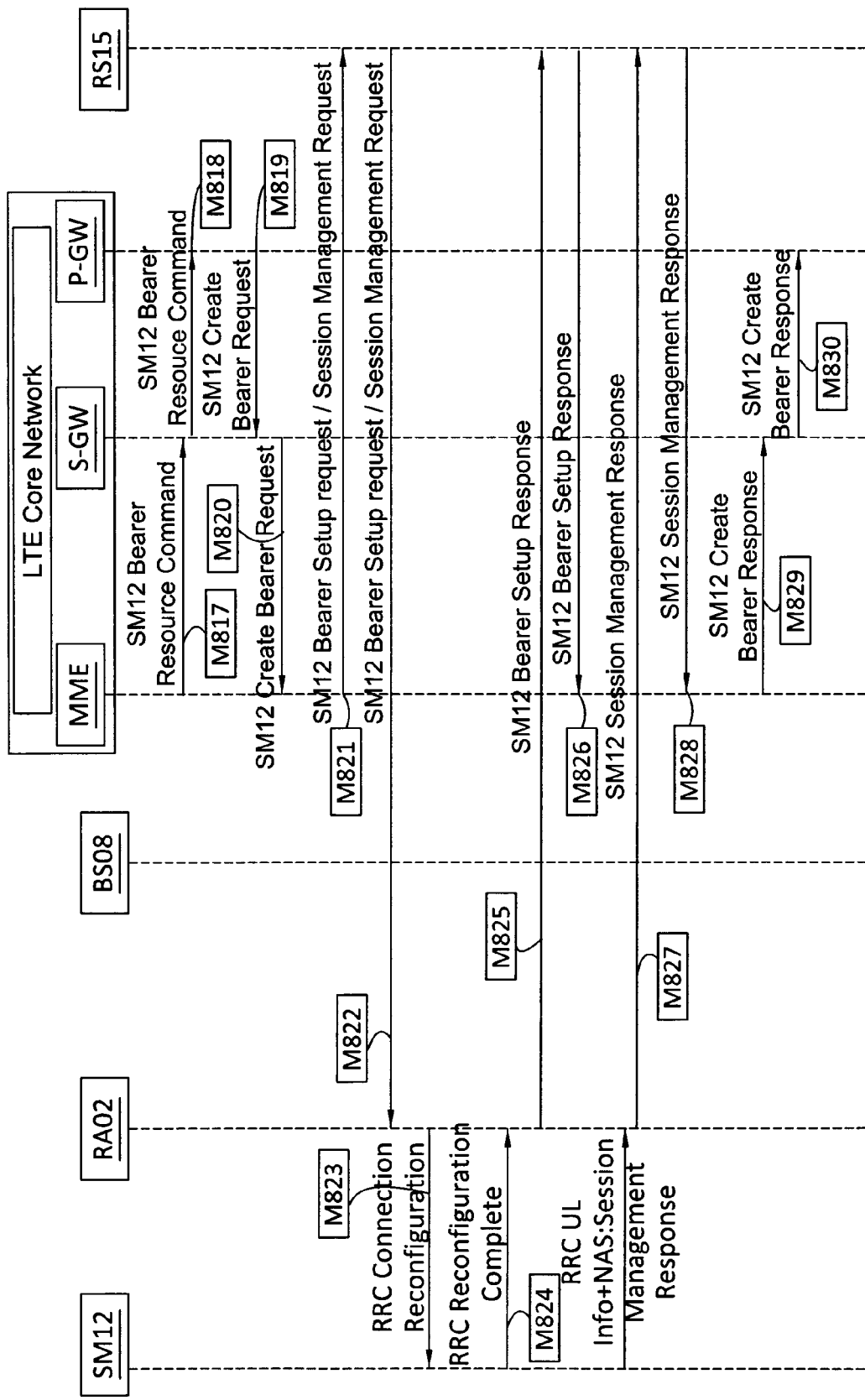

Regular base stations do not take into consideration the impact of a multi-hop network; the assumption is that the backhauling bandwidth is reliable enough. However, in the case of a multi-hop network, that is not always true. For such cases, any or all of several methods may be employed to keep the backhauling bandwidth as reliable as possible:

SM12 in FIGS. 13a-13b initiates the procedure by requesting a dedicated bearer. This method may apply when the user equipment needs a different packet handling for example real-time VoIP. The procedure begins with a request for a dedicated bearer message [M801]. The message is processed by the serving base station of SM12, RA02, where it forwards the request [M802] to the relay server RS15. The relay server analyses the request and affiliates it with its local DB (e.g. topology, load) that enables it to make smart decisions to assess in the bearer allocation the request for hierarchical networks. In this example the relay server creates a dedicated bearer for each hop; in another example it may order something else. The relay server requests [M803] a dedicated bearer for the serving base station of SM12 from the core network, which triggers a standard dedicated bearer allocation for RA02. Following this, the relay server sends the request for a dedicated bearer for SM12.

Figure 14A:
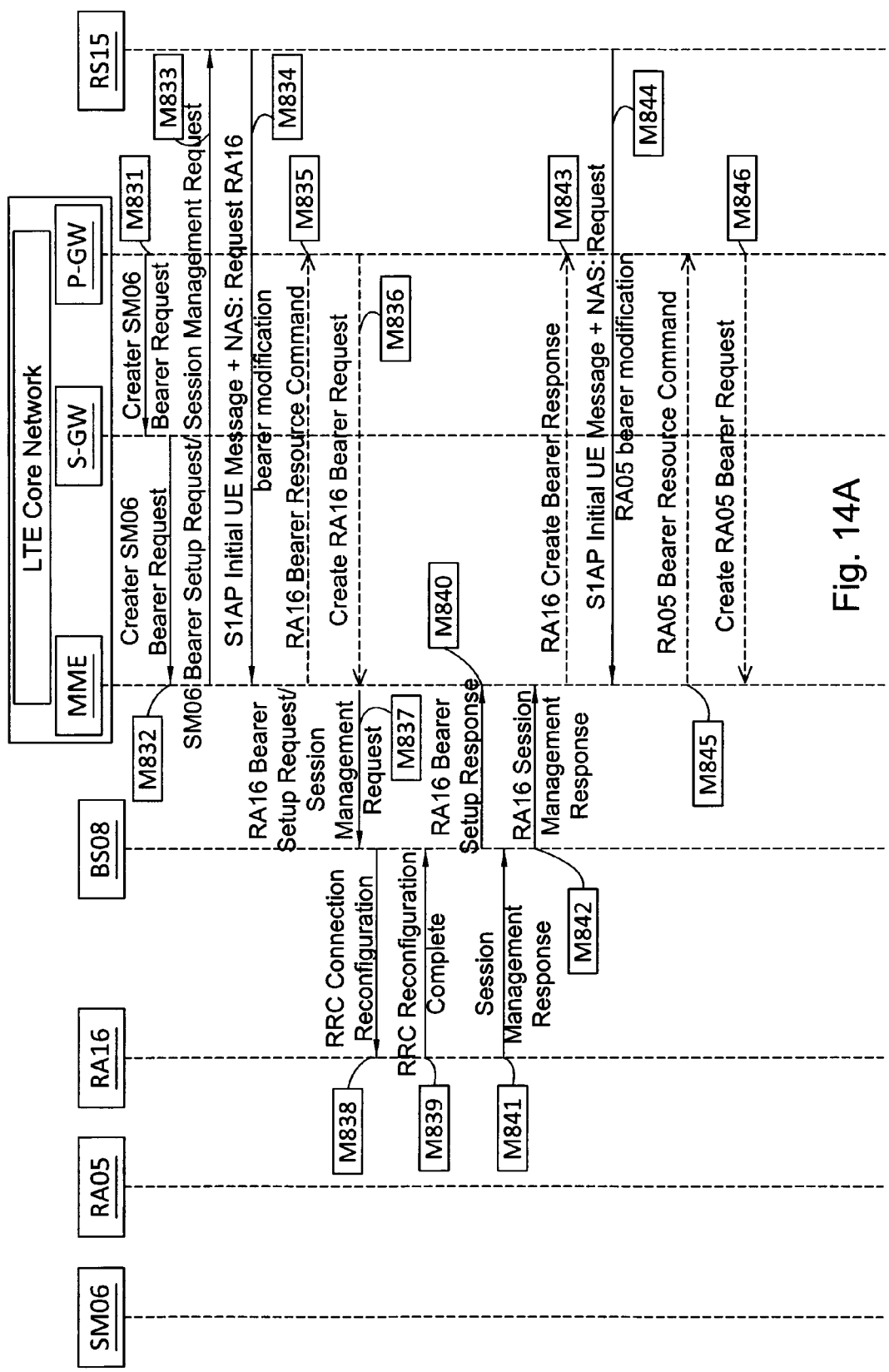
Figure 14B:
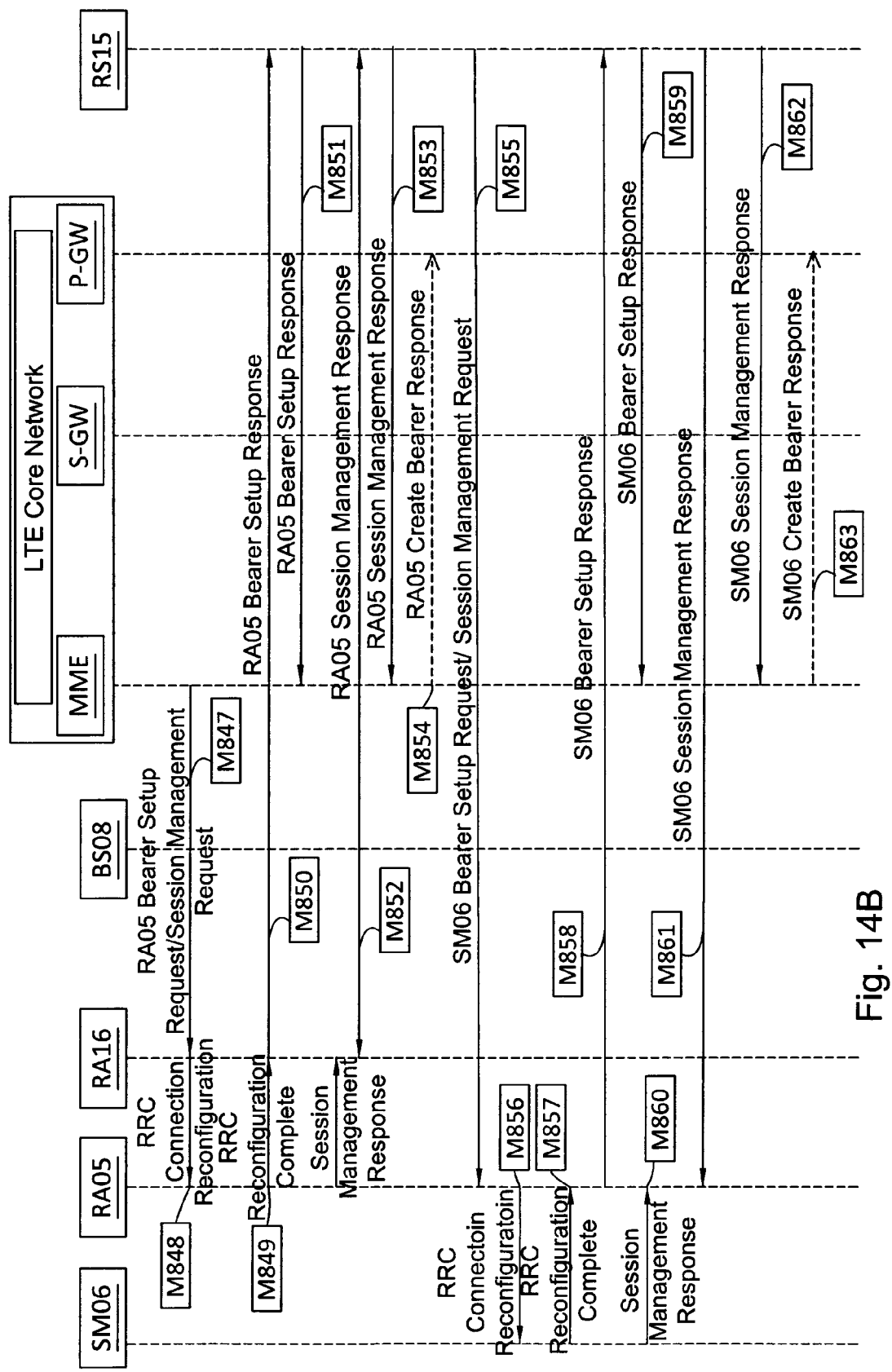

FIGS. 14a-14b, taken together, describe in more detail, the scenario described in FIG. 8a, in accordance with an embodiment of the present invention. The core network creates a dedicated bearer between the core and SM06 in order to enable communication with SM12 which is of an application-mandated quality, following which the core typically sends a message to the serving base station of SM06, RA05 using the relay server as a proxy. The relay server may create an additional extra 2 dedicated bearers in order to support the core network request between the serving base station of RA05, RA16 [M834], which is a relay station, and between RA05 and the core network [M844]. The request then triggers a standard flow of allocation of a dedicated bearer for RA02 and RA16, respectively.

FIG. 9a depicts communication between SM12 and SM06, SM12 is connected to the core network through RA02 using communication radio link [LI12], and RA02 is connected to the core network through BS01 using communication radio link LI18. SM06 connects to the core network through RA09, RA16 and BS08.

In this example SM12 initiates a communication session with SM06 by, for example, calling SM06. The request is forwarded to RA02; SM06 is not under RA02, so the request is forwarded to BS01 over radio links LI01; SM06 is not under BS01, so the request is forwarded over radio link LI02 to the core network through the relay server. SM06 is searched and located as attached to RA09. A communication link or path to SM06 is established in 3-hops using LI03, LI04 and the radio link between SM06 and its serving base station RA09, LI05. After the communication link between the core and SM06 is established, an acknowledgement message may be sent to SM12 using the communication link between SM12 and the core. After the communication link between SM12 and SM06 has been established, SM12 and SM06 are able to communicate.

Another example of using a local routing manager in the RA is depicted in FIG. 9B. In this example, SM11 initiates a communication session with SM07, and the request is forwarded to its serving base station, RA05. SM07 is not under RA05 and the request is forwarded to its serving base station, RA16. SM07 is under RA16, a communication is established between SM07 and RA16 over LI20 and an acknowledgment is sent to SM11 over LI22 and LI25. After the communication has been established, SM11 and SM07 are able to communicate.

Figure 15A:
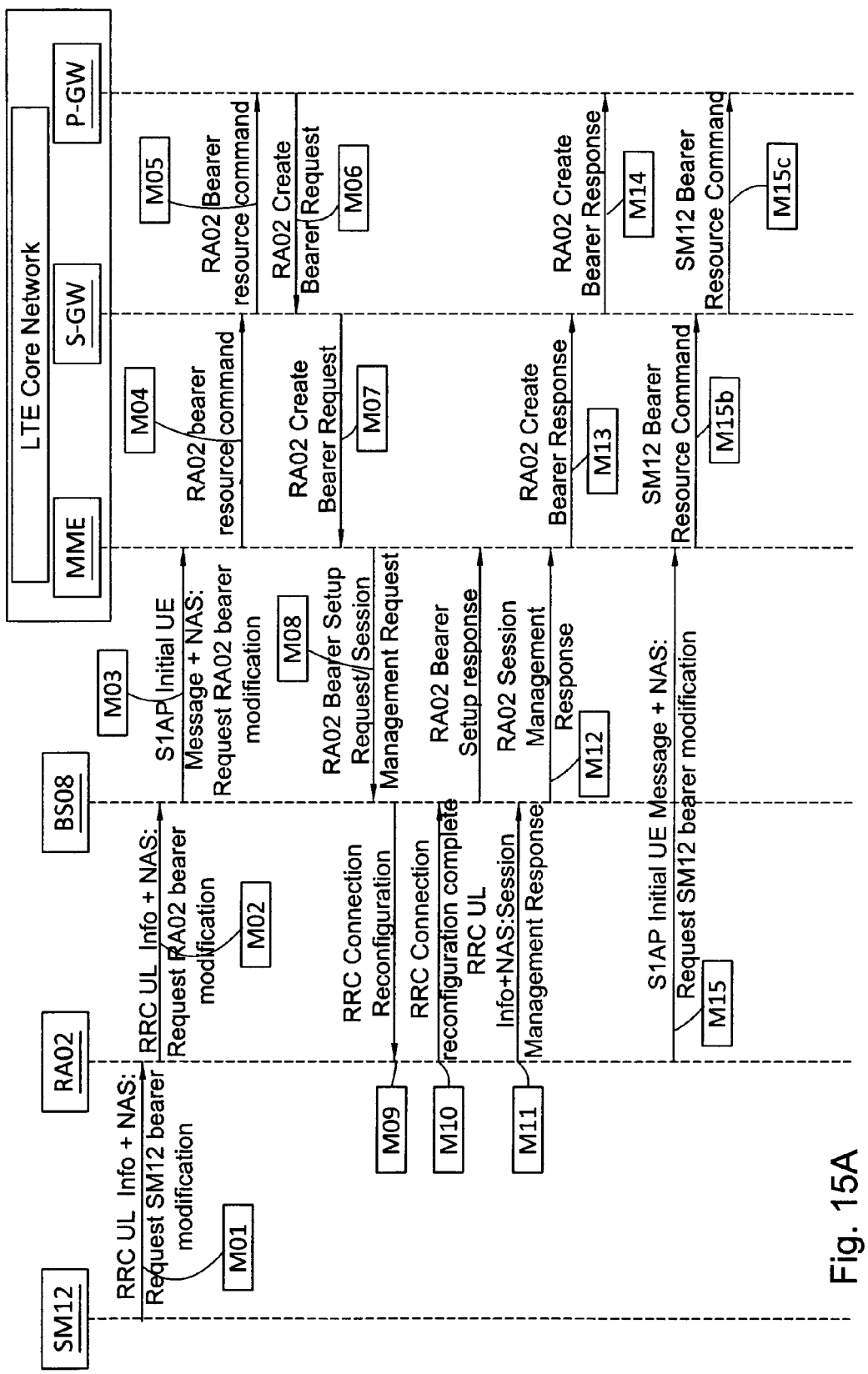
FIGS. 15a-15b, 16a-16b are diagrams of message description bearer setup procedures in LTE for a multi-hop hierarchical cellular network system using a distributed router, all constructed and operative in accordance with certain embodiments of the present invention.
Figure 15B:
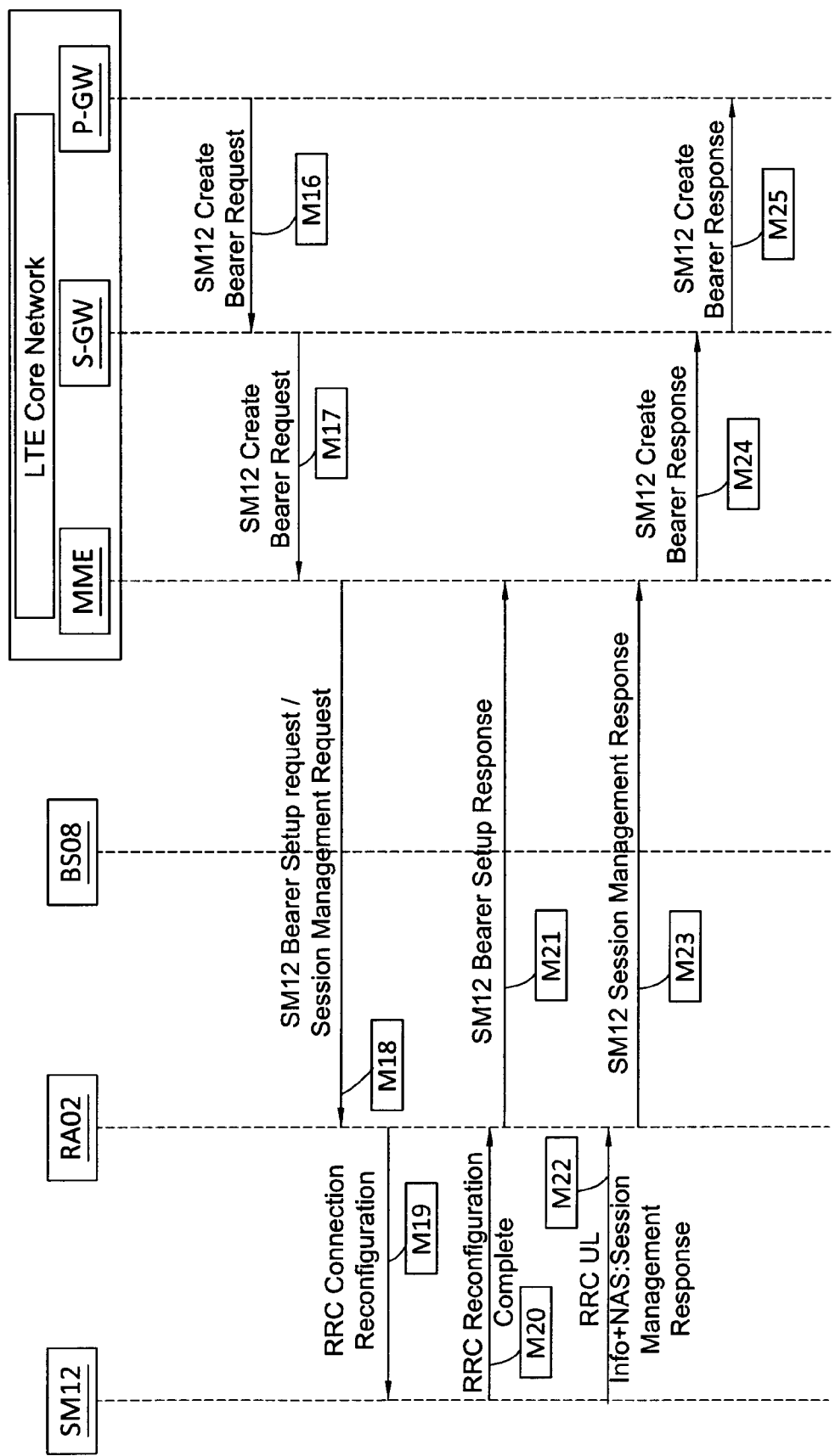

FIGS. 15a-15b, taken together, depict the message sequence of the components, in the scenario described in FIG. 9a, in accordance with an embodiment of the present invention. In order to support packet in a particular flow, a bearer is created to support the specific requirements (e.g.

one or more of jitter, priority, delay) of the flow and the privilege of the user. The protocol is based on the 3GPP LTE standard.

The procedure may be similar to the one previously described in FIGS. 8a-8b, however now the method is carried out locally, using a relay manager that resides inside the RA.

SM12 initiates the procedure by requesting a dedicated bearer. This method may apply when the user equipment needs a different packet handling, for example real-time VoIP. The procedure begins with request for a dedicated bearer message[M01]. the message is processed by the serving base station of SM12, RA05, which triggers a request [M02] for a dedicated bearer for the relay serving base station RA05. The dedicated bearer for the relay station is set using a standard 3GPP method [M02-M14]. Only then, typically, the serving relay base station [RA05] sends the bearer allocation request for the SM12 [M26] using a GPRS tunnel between the RA02 and the core network. It then triggers a standard bearer setup procedure as depicted in messages [M15-M25].

Figure 16A:
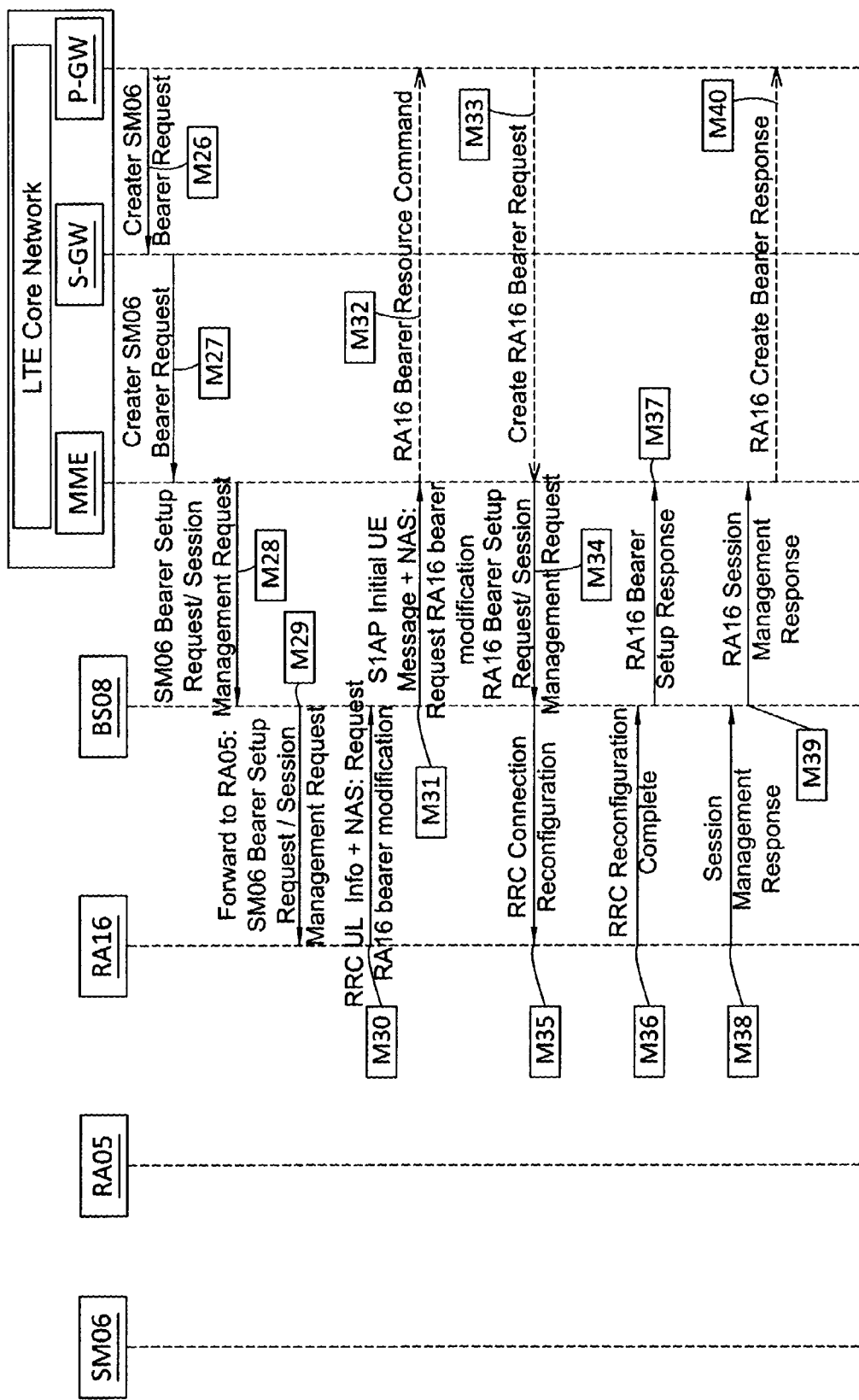
Figure 16B:
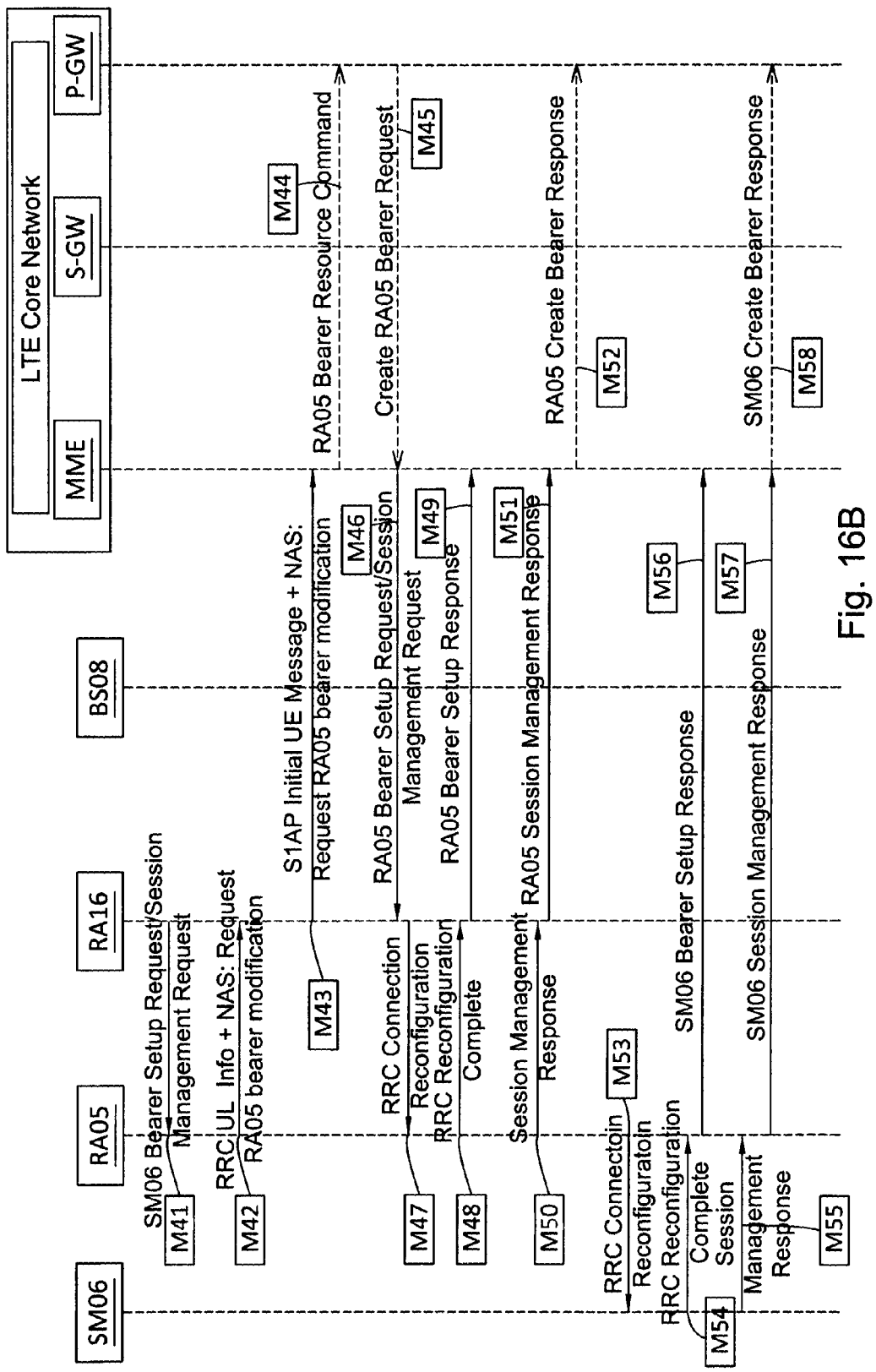

FIGS. 16a-16b describe a continuation of the scenario of FIG. 9a. The core network creates a dedicated bearer between the core and SM06 in order to enable communication with SM12 of an application-mandated quality. The core sends a message to the serving base station of SM06, RA05 using a GPRS tunnel, the relay serving base stations that are on the path to the designated device, in the example RA16, inspects the message [m29] and requests an additional bearer to support the new dedicated bearer for SM06 e.g. as described in messages [m30-m40]. RA16 then forwards [m41] the request to the serving base station of SM06 which is the relay agent RA05. RA05 requests an additional dedicated bearer to support the dedicated bearer of SM06 [m42-m52]. RA05 may then continue the bearer setup procedure that was initialized by the core network in [m28] in [m53], which ends up in [m58] in a successful dedicated bearer setup between the core and SM06.

Figure 17:
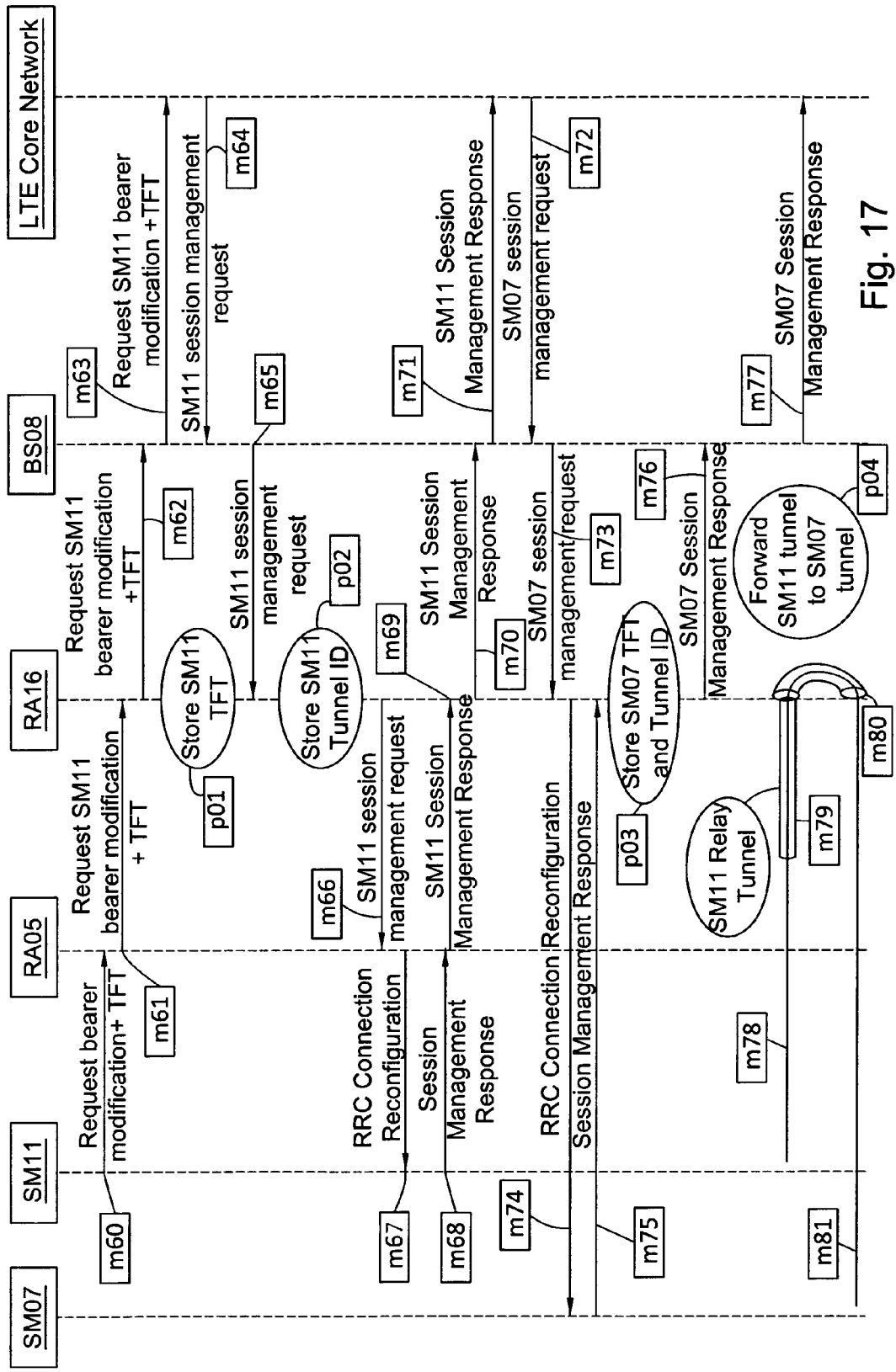
FIG. 17 is a diagram of a message sequence, in accordance with an embodiment of the present invention, of the components in the scenario described in FIG. 9b, using a local routing manager, and based on the 3GPP LTE standard, wherein the local routing manager is operative to perform a local process in which information is routed locally from one sibling node to another or from one sibling tunnel to another.

FIG. 17 depicts a message sequence, in accordance with an embodiment of the present invention, of the components in the scenario described in FIG. 9b, using a local routing manager, and based on the 3GPP LTE standard. In the example, SM11 communicates with SM07, and RA16 is the lowest common node, in the hierarchical cellular network. RA16 forwards messages that are designated to a node that is under its branch, from a node that is under its branch. Every relay node has a message inspection capability, enabling it to infer its sibling nodes (RA, SM) and the available tunnels, source and destination, by inspecting the S1AP messages of its siblings. On each node, the sibling nodes may be stored in a local table. SM11 initiates the procedure by requesting bearer modification that contains a traffic filter template or traffic flow template (TFT) with its source address and designated node address SM07. Typically, the TFT is associated with the bearer in memory, and is used in order to correlate packets to bearer.

On a hop by hop basis, each node inspects the message. If the designated address is under the node; the node stores the filter and waits for activation of the new bearer in order to get the GPRS tunnel ID. Afterwards, the node is able to locally route messages, that are sent from a source address over a GPRS tunnel to a designated address over another tunnel. In the example depicted in FIG. 17, RA05 receives the bearer modification request [m50], SM07 is not under RA05's branch, and RA05 forwards the request to its serving base station, RA16. SM07 is under RA16 branch, so it stores information that is considered useful, for example TFT, and forwards the request to its serving base station, BS08. In case there are no errors, a session management request [m65] may be sent from the core through BS08 to the serving base station of SM11, RA05 containing the new tunnel ID. RA16 stores the tunnel ID of SM11 for future use.

Information that is considered useful may for example include information which allows bandwidth allocation to be conserved, or which allows operation in case of disconnection from the core network, e.g. by the ability to shortcut including avoiding sending data back and forth and avoiding situations in which data packets cross a common node between source and designated tunnel. Information that is considered useful may for example include information which allows a source tunnel to be connected to a designated tunnel without involving the cellular core (e.g., the TFTs of the source tunnel and of the designated tunnel).

Another tunnel [m72] is built between SM07 and SM11. Normally the message is sent by a service residing in the core network, or by the designated user, but may be triggered by a local RA. RA16 stores the tunnel ID and the TFT of the new tunnel [p03]. RA16 maps [p04] source tunnel [m78], indicated by GTP header, to designated tunnel [m81]. In the example, the source tunnel [m78] is encapsulated by another relay tunnel [m79].

In a conventional cellular network, mobile user equipment typically attaches to the base station with the highest radio power; from there the base station can hand over the mobile equipment to another base station in case of load on the current serving base station, or in a case that there is a better serving base station, in this case, current serving base station will move the user equipment to the better one.

In a hierarchical cellular network, it may be desired to maximize usage of the backhauling resource. This may be done using centralistic topology building dynamic methods that take into account aspects of user requirements in real-time and change the topology by ordering on handovers, or by using a greedy distributed local manager that listens to broadcast messages that give the backhauling grade of the near neighbors (this may be reported using the measurement report of the different UE attached to the serving base station) or by getting near neighbors' grades from a centralistic manager by giving the cell IDs as received.

Figure 18A:
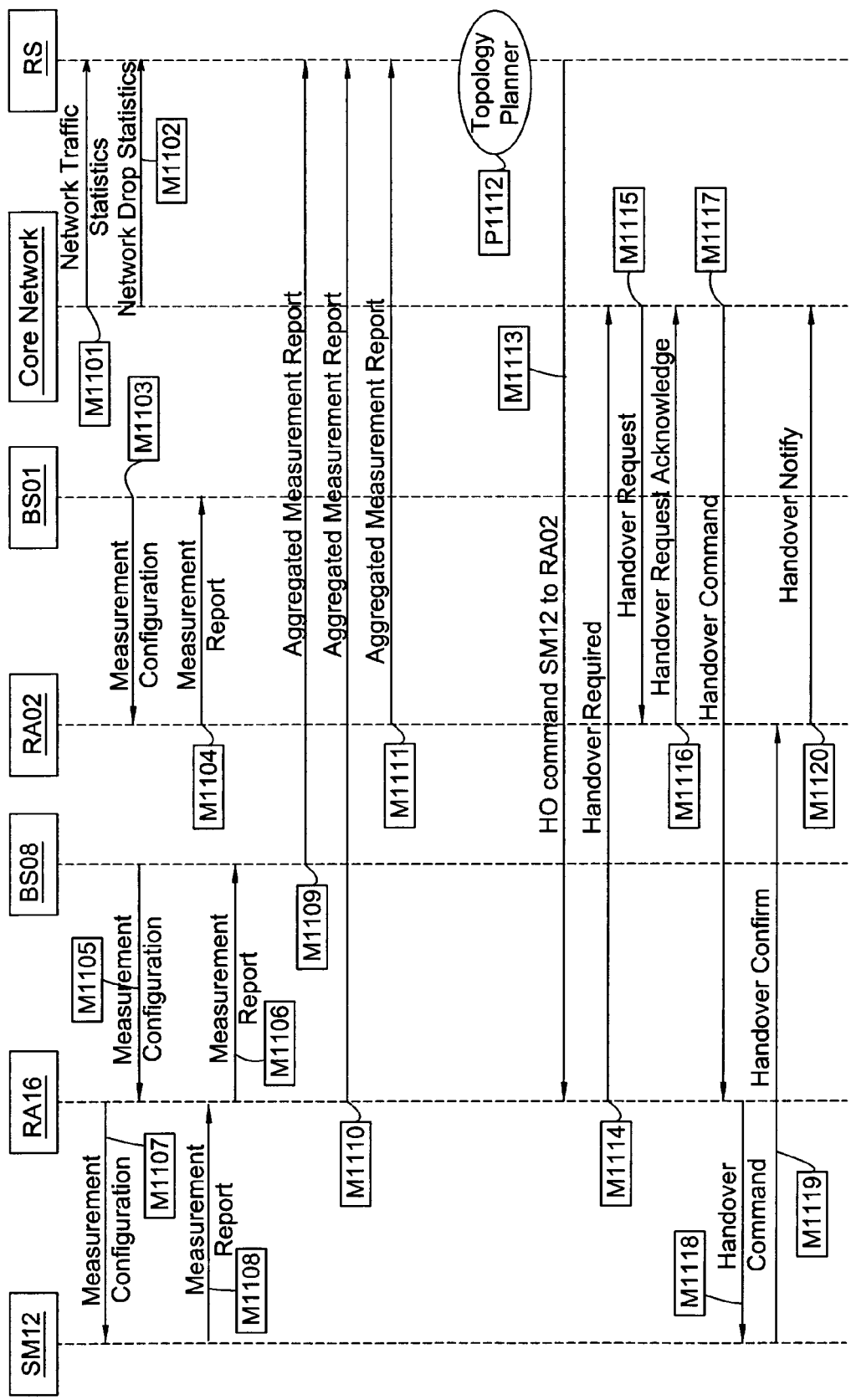
FIGS. 18A, 18B are message descriptions of a routing management method in LTE using a centralistic routing manager, the method being operative in accordance with certain embodiments of the present invention.
Figure 18B:
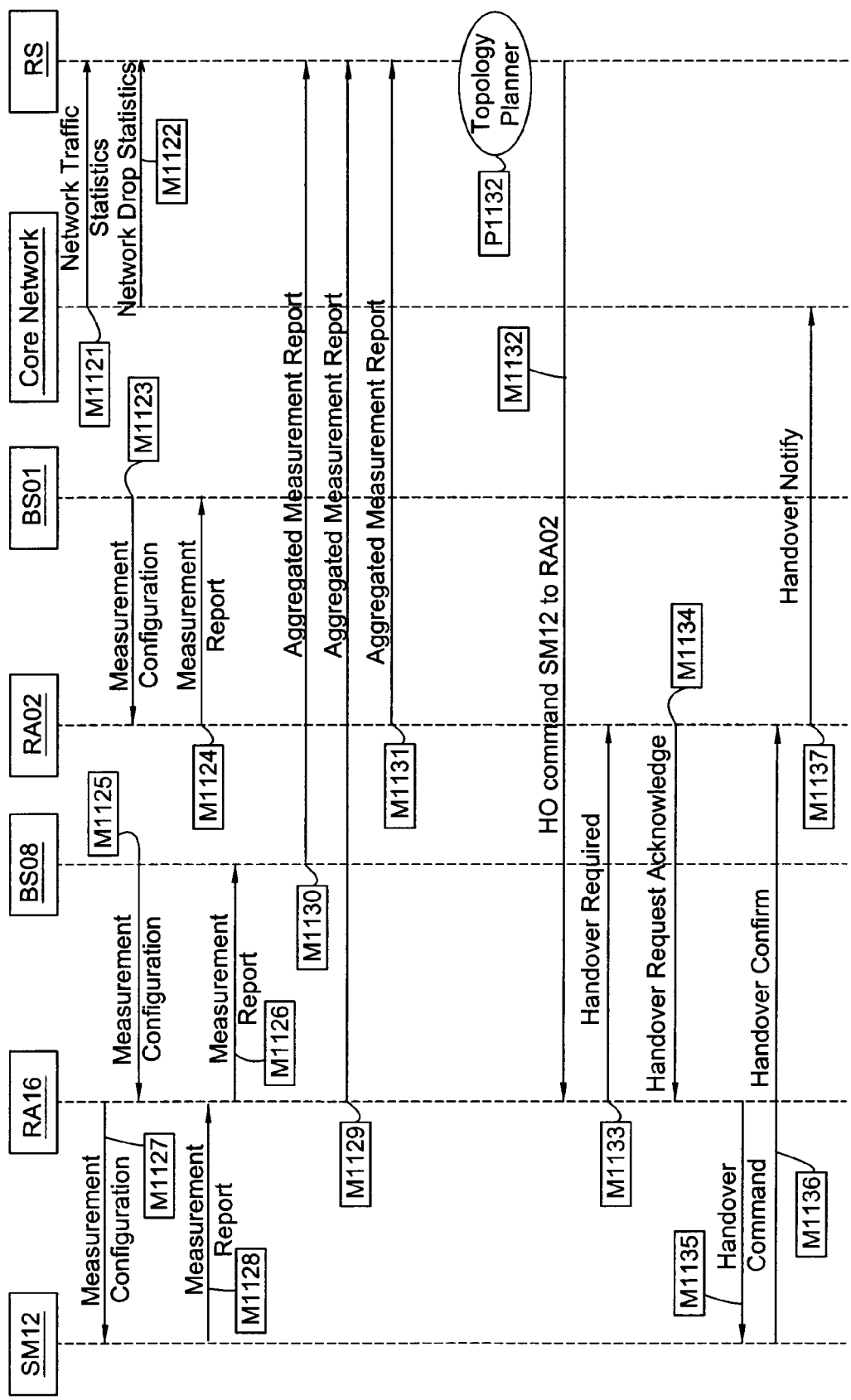

FIGS. 18a, 18b describe the topology management method using a centralistic routing manager. Arena measurement reports may be reported to a centralistic routing manager, and measurement reports may be used with a combination of network throughput and drop rate statistics in order to estimate the potential capacity of each potential link. A potential link is between a UE (SM or RA) and an eNB when said UE sends a measurement report on said eNB to its serving eNB (RA or BS) that includes a measurement report of the said UE on its current serving eNB.

FIG. 18a uses the S1 interface in order to request an HO. The measurement reports are aggregated by the various relay agents (RA16 and RA02 in the example) and reported [M1109], [M1111]. The relay server runs the Topology planner [p1112] that affiliates measurement reports with network traffic statistics, drops statistics, service requirements and any valuable data resource (for example GIS) that can help to get smart decisions; the different metrics are used in order to give intermediate grades for each link. Then the metrics are sent to a multi-objective, like a scheduler, that orders handover, if needed, e.g. as described herein with reference to FIG. 19a. The handover orders are sent back to the serving base station [M1113] and start the standard handover procedure [M1114-M1120].

FIG. 18*b* is similar to FIG. 18*a* except that the embodiment of FIG. 18*b* uses a standard X2 handover procedure [M1133-M1137].

Figure 18C:
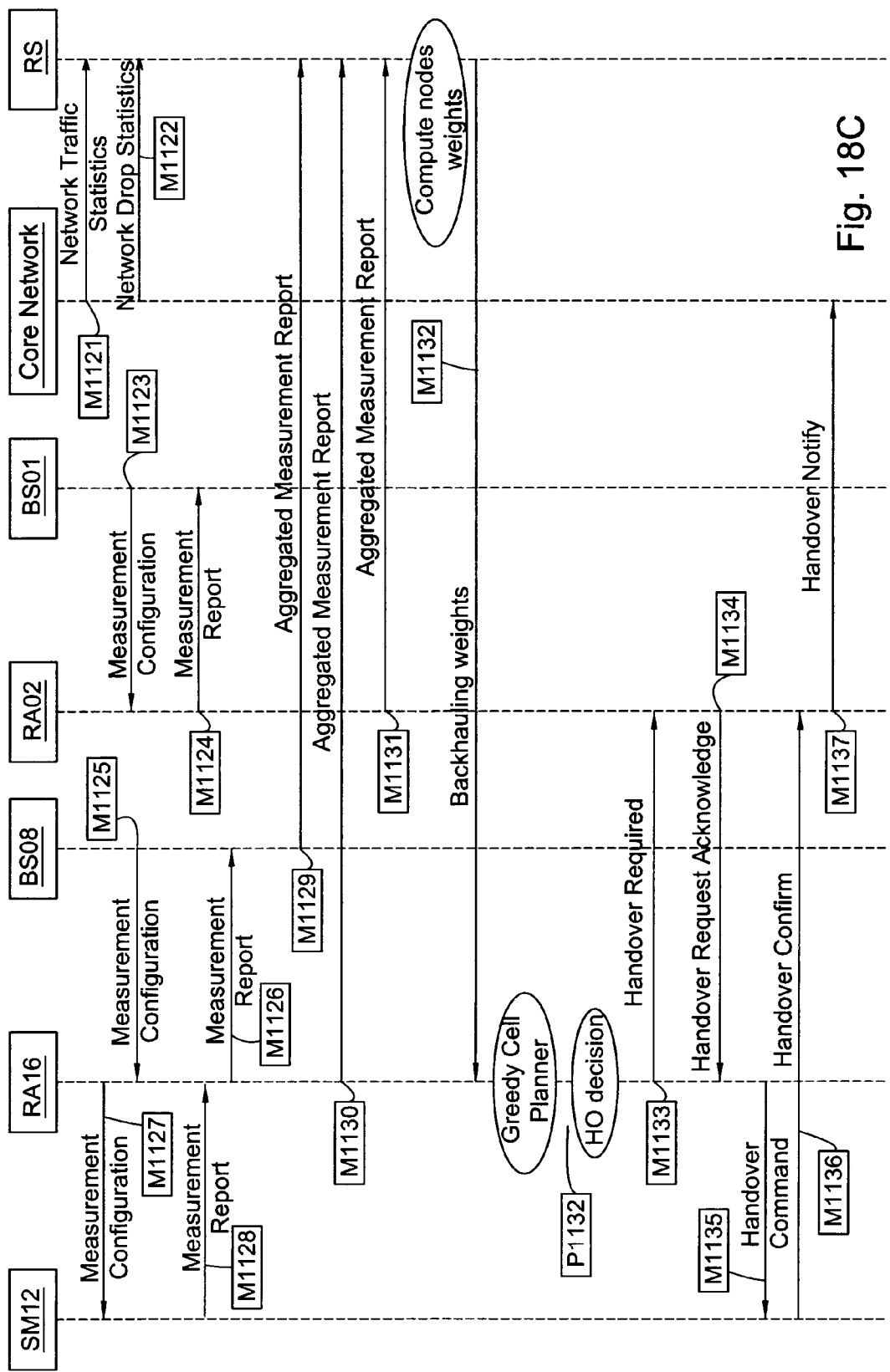
FIG. 18C is a detailed message description of a routing management method in LTE using a hybrid (distributed+ centralistic) routing manager, the method being operative in accordance with certain embodiments of the present invention.

FIG. 18*c* depicts a topology management method that combines both a centralistic manager and local routing managers, as in the example in FIG. 18*a*. Typically, the centralistic manager is responsible for computing the backhauling quality grade of each network node, and then sends the quality grade to the clients (RA). According to the backhauling quality grade of its neighbors and radio measurement messages, a local routing manager can order handover, if required by the application. For example, SM12 sends a measurement report [M1128] that indicates that it hears RA02 and RA16, the quality grade of the power for SM12→RA16=4, SM12→RA02=6, so SM12 does not handover to RA02. The relay service indicates that [M1132] RA02 backhauling quality grade=2 and RA16 backhauling quality grade is 5. Now, the total quality grade SM12→RA02→core=8 and SM12→RA16→core=9 and therefore RA16 sends a handover required[M1133] message and handover SM12 to RA02, e.g. as described herein with reference to FIG. 19*b*.

Figure 18D:
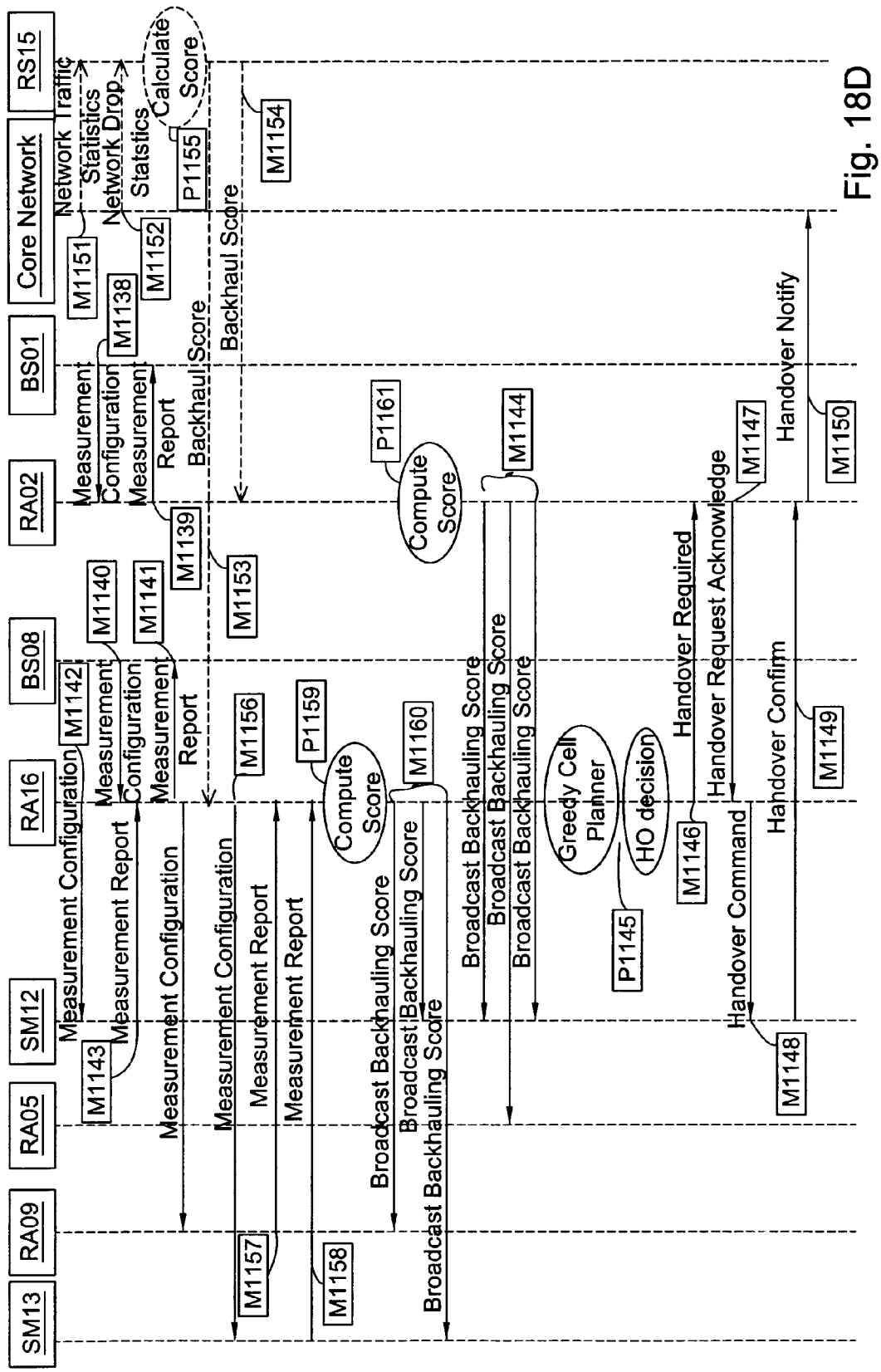
FIG. 18D is a detailed message description of a routing management method in LTE using distributed routing manager, the method being operative in accordance with certain embodiments of the present invention.

FIG. 18*d* depicts a distributed topology management method. In order to build the optimal routing tree, the method of FIG. 18*d* uses a local routing greedy manager, and backhauling grades may be exchanged between the different relay agents by sending broadcast messages [m1144, m1160]. The local routing manager computes its backhauling quality grade e.g. by adding its current weight to the quality grade of its backhauling link. It is optional to add a relay server in order to consider additional parameters [m1153, m1154]. For example, SM12 is connected to RA16; it sends a measurement report [m1143] that indicates that the quality grade of SM12→RA16=4 and SM12→RA02=6, so SM12 does not handover to RA02.

RA09 hears only RA16 at quality=6 and SM13 at quality=4. RA16 hears BS08 at quality=5, so its current backhauling quality grade is 5. It broadcasts it using the broadcast backhauling channel. Now quality SM12→RA16→Core=9, the backhauling quality grade of RA09=11 and SM13→RA16→Core=9. RA02 hears BS01 at quality=2 so its backhauling quality=2. RA02 broadcasts that its backhauling quality=2 [m1144], RA16 hears that RA02 backhauling quality grade=2, [M1144] directly by listening to the backhauling broadcast channel or indirectly by getting measurement messages from equipment that is aware of RA02 backhauling quality. Now, the total quality grade SM12→RA02→core=8 and SM12→RA16→core=9 and therefore RA16 sends a handover required [M1146] message and handover SM12 to RA02. FIG. 14*b* schematically describes this method.

Referring again to FIG. 14, a multi-objective optimizer typically comprises a process that simultaneously optimize two or more conflicting objective subject to a certain constraint. For example maximal throughput and minimal delay, in the topology depicted in FIG. 8*b*. In order to obtain maximal throughput from SM07 to the core network an optimal path may pass through RA09, RA16 and BS08, while the minimum delay may yield that the optimal path is RA02 and BS01. A multi-objective optimizer may decide how much of one objective should be sacrificed in order to adequately achieve other objectives. One solution for the multi-objective problem is to combine all of the objectives into a single objective function, for example a weighted linear sum of the objectives:

$$f(R_j) = \Sigma_i w_i x_i$$

R=minimum$_j$(f(R$_j$)); where R is the optimal route.

Figure 19A:
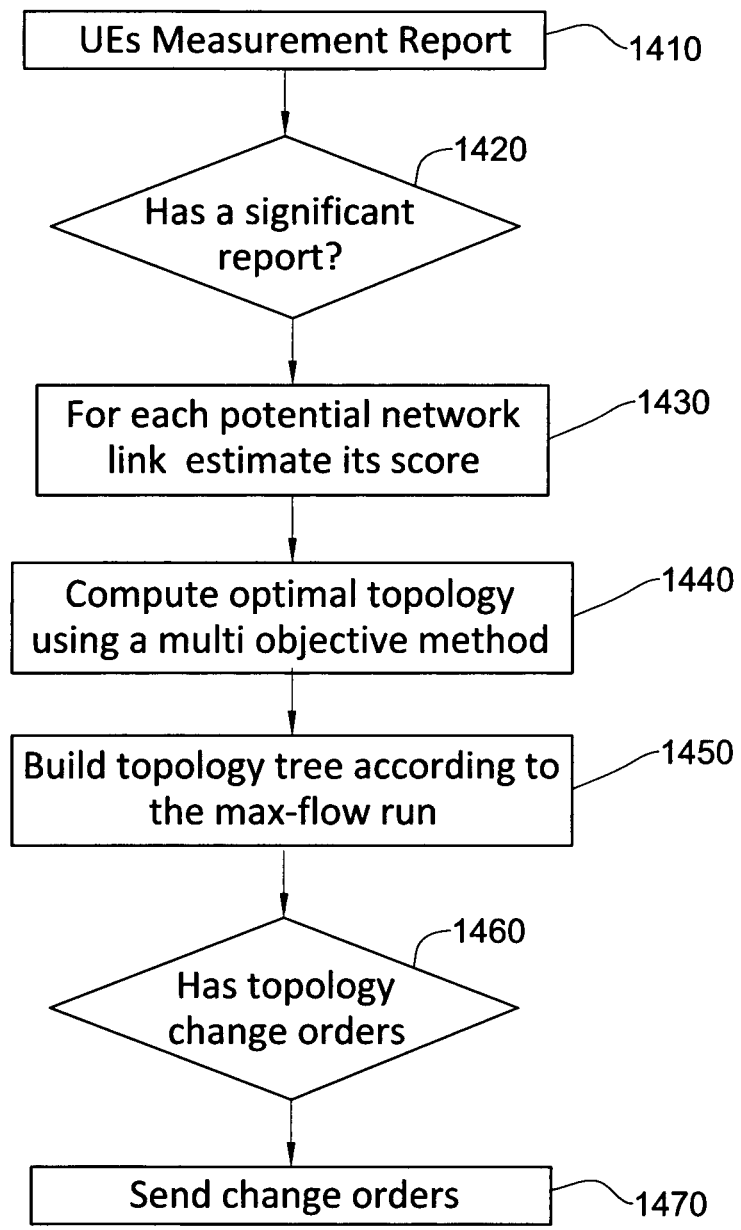
FIG. 19a is a simplified flowchart illustration of an example of a centralistic multi-objective cell routing planner method, the method being operative in accordance with certain embodiments of the present invention.

FIG. 19*a* describes an example of a centralistic multi-objective cell routing planner method, the method including some or all of the steps illustrated in FIG. 19*a*, suitably ordered e.g. as shown. Measurement reports of the UEs (SM/RA) are forwarded to the cell planner method [step 1410]. The method typically goes over all the forwarded measurement reports to find if there a significant changes in the topology [step 1420], for example a drop in the received signal reference quality (RSRQ) in the active link or an increase in the RSRQ of another link that is not currently active. If there is a significant change reported, the planner runs on each link and computes its score [step 1430] for example one or more of link quality, the number of active users on a node, hops from the core and weighted aggregation of several criteria. Then the planner finds the optimal path from the nodes to the core, using a multi-objective optimizer [step 1440], for example using the weighted linear metric with the Dijkstra algorithm. The new optimized computed topology is compared with the old topology [step 1450]. If they are different, every node that in the optimal topology is linked to a different serving base station, and the node's current serving base station is ordered to handover the node to the new optimal serving base station [step 1470].

Figure 19B:
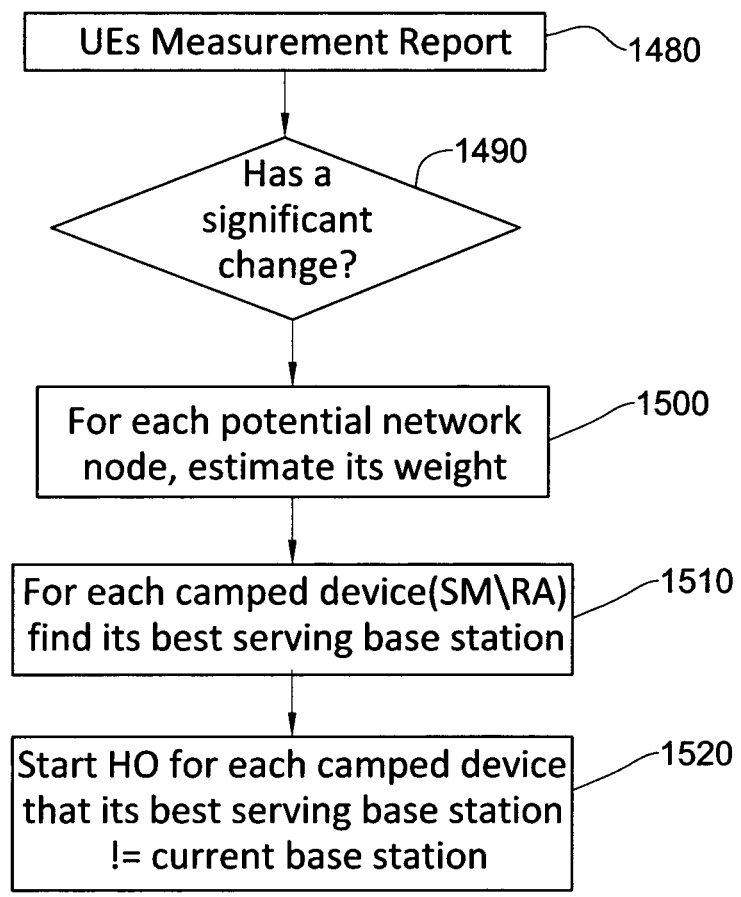
FIG. 19b describes an example of a distributed cell routing planner method, the method being operative in accordance with certain embodiments of the present invention.

FIG. 19*b* describes an example of a distributed cell routing planner method, the method including some or all of the steps illustrated in FIG. 19*b*, suitably ordered e.g. as shown. Measurement reports of the UEs (SM/RA) are typically monitored by the local cell planner which may reside in the RA [step 1415]. The method goes over all received measurement reports to determine whether or not there are significant changes in the topology [step 1425], for example a drop in the received signal reference quality (RSRQ) in the active link or an increase in the RSRQ of another link that is not currently active. If there is a significant change report, the planner runs on each link and computes its score [step 1435] for example one or more of: link quality, the number of active users on a node, hops from the core and weighted aggregation of several criteria. Than the planner finds the best serving base station for each camped node, for example by finding the minimum weight for each served node [step 1445]. If the new serving node of each camped device is different than current base station than a hand over method is initiated [step 1455].

More generally, the methods and systems shown and described herein as being applicable e.g. to certain protocols are also applicable to protocols which are not identical to the mobile communication protocols specifically mentioned herein but have relevant features in common therewith.

Flowchart illustrations appearing herein are intended to describe steps of an example method where, alternatively, a method may be substituted which includes only some of the steps illustrated and/or a method in which the steps are differently ordered.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required, or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A mobile communication management system serving a hierarchical cellular network having linked nodes, the nodes including a core, base stations and mobile communication devices, thereby to define a topology of communication links between said nodes, the system comprising:
a processor and memory providing the following functionality:
a topology server including:
a topology learner which dynamically learns the topology and
a topology storing functionality which stores the topology learned by the topology learner as at least one topology map structured as a hierarchy having more than 2 levels,
wherein said server uses said topology map to dynamically route information through at least one downlinks to arrive at a desired destination,
when an error occurs whereby a message fails to reach said desired destination, a message is broadcast to at least one node which may be the desired destination,
and when the desired destination is found, at a new location within the network, at least one local routing table is updated to reflect that said desired destination is now at said new location,
wherein said server uses said topology map to dynamically route information by indicating, for each of at least one levels, a sibling-node at said level via which node the information is to arrive at the desired destination within said map
wherein the server broadcasts data packets intended for a destination node not found at a topological location identified in said map by the server, to at least one base station in the topology map, each of which broadcast to at least one of their "children" nodes in the hierarchal network, and
wherein the topology map defines a set of nodes and wherein the server broadcasts data packets intended for the not-found destination node only to a subset of said set of nodes wherein the subset's node/s are adjacent topologically, in said map, to the topological location identified by the server as having belonged to the destination node.

2. The system according to claim 1 wherein said topology server resides in a single node within said network.

3. The system according to claim 1 wherein said topology-storing functionality stores the topology as a hierarchy tree whose number of levels changes dynamically.

4. The system according to claim 1 wherein said topology server is distributed over a set of nodes within said network such that at least one topology map, representing at least a portion of the topology of the network, resides within each of said set of nodes.

5. The system according to claim 4 wherein at least one node stores a topology map including a list of at least some of its descendants and at least some routing information required to get to the descendants.

6. The system according to claim 1 wherein topology is determined centralistically based on a potential number of hops.

7. The system according to claim 1 wherein topology is determined at distributed locations over the topology based on a backhauling link quality score characterizing at least one inter-node link.

8. The system according to claim 1 and also comprising a local routing manager operative to perform a local process in which information is routed locally from one sibling node to another.

9. The system according to claim 1 wherein a message is broadcast to a set of at least one nodes selected to be likely new locations of the destination node, given the last known location thereof, rather than to all nodes.

10. The system according to claim 1 wherein the message broadcast to said at least one node comprises the message which failed to reach its destination node.

11. The system according to claim 1 wherein said error is indicated by receipt of a 'nack' message.

12. The system according to claim 1 wherein said error is indicated by a timeout on receipt of an 'ack' message.

13. The system according to claim 1 wherein the message is broadcast to all available destinations.

14. The system according to claim 1 wherein the message is broadcast only to a last known branch in the network.

15. The system according to claim 1 wherein the message is broadcast only to a last known destination and its neighbors in the network.

16. A mobile communication management method operative for connecting a mobile communication device with a base station and serving a hierarchical cellular network having linked nodes, the nodes including a core, base stations and mobile communication devices, thereby to define a topology of communication links between said nodes, the method comprising:
   providing a cellular communication link topology server including:
   providing a cellular communication link topology learner which dynamically learns the topology
   providing a cellular communication link topology storing functionality which stores the cellular communication link topology learned by the cellular communication link topology learner as at least one cellular communication link topology map structured as a hierarchy having more than 2 levels and
   connecting at least one mobile communication device to at least one base station based on the cellular communication link topology map,
   wherein said server uses said topology map to dynamically route information by indicating, for each of at least one levels, a sibling-node at said level via which node the information is to arrive at the desired destination within said map,
   wherein the server broadcasts data packets intended for a destination node not found at a topological location identified in said map by the server, to at least one base station in the topology map, each of which broadcast to at least one of their "children" nodes in the hierarchal network.

17. The method according to claim 16 wherein said server uses said topology map to dynamically route information through at least one downlinks to arrive at a desired destination.

18. The method according to claim 17 wherein said server uses said topology map to dynamically route information by indicating, for each of at least one levels, a sibling-node at said level via which node the information is to arrive at the desired destination within said map.

19. The method according to claim 18 wherein the server broadcasts a paging message intended to locate a destination node not found at a topological location, identified within said map by the server, to at least some base stations in the hierarchy, each of which broadcasts to at least one of their "children" nodes in the hierarchy.

20. The method according to claim 19 wherein said not-found destination node sends an 'ack', upon receipt of the paging message, to its father node in the hierarchy and said 'ack' is transmitted (uplink) through the hierarchy to the topology server.

21. The method according to claim 16 wherein a routing tree is built using a local routing [greedy] manager, backhauling grades are exchanged between relay agents by sending broadcast messages, and the local routing manager computes its backhauling quality grade by combining at least the local routing manager's current grade and a quality grade of the local routing manager's backhauling link.

22. The method according to claim 16 and also comprising distributed cell routing planning including local monitoring of measurement reports of UEs to determine whether or not there are significant changes in the topology,
and wherein if a significant change is reported,
   a score is computed on each link and a best serving base station for each camped node is identified,
   and subsequently, if the best serving base station is different from a currently serving base station, hand over is initiated.

23. A computer program product, comprising a non-transitory tangible computer readable medium having computer readable program code embodied therein, said computer readable program code being configured to be operative for connecting a mobile communication device with a base station and serving a hierarchical cellular network having linked nodes, the nodes including a core, base stations and mobile communication devices, thereby to define a topology of communication links between said nodes, the code being configured to:
   provide a cellular communication link topology server including:
   provide a cellular communication link topology learner which dynamically learns the topology
   provide a cellular communication link topology storing functionality which stores the cellular communication link topology learned by the cellular communication link topology learner as at least one cellular communication link topology map structured as a hierarchy having more than 2 levels and
   connect at least one mobile communication device to at least one base station based on the cellular link topology map,
   wherein said server uses said topology map to dynamically route information by indicating, for each of at least one levels, a sibling-node at said level via which node the information is to arrive at the desired destination within said map, and
   wherein the topology map defines a set of nodes and wherein the server broadcasts data packets intended for the not-found destination node only to a subset of said set of nodes wherein the subset's node/s are adjacent topologically, in said map, to the topological location identified by the server as having belonged to the destination node.

24. The product according to claim 23 wherein the server broadcasts data packets intended for a destination node not found at a topological location identified in said map by the server, to at least one base station in the topology map, each of which broadcast to at least one of their "children" nodes in the hierarchal network.

25. The product according to claim 24 wherein the topology map defines a set of nodes and wherein the server broadcasts data packets intended for the not-found destination node only to a subset of said set of nodes wherein the subset's node/s are adjacent topologically, in said map, to the topological location identified by the server as having belonged to the destination node.

26. The product according to claim 24 wherein the server performs a recursive process in which, in a first iteration, the server broadcasts data packets intended for a destination node not found at a topological location identified in said map by the server, to at least one base station in the topology map, each of which, in a second iteration, broadcast to at least one of their "children" nodes in the hierarchical network, and wherein the "children" nodes continue the recursive process for at least a third iteration, down to a desired level of descendants of said "children" nodes.

* * * * *